(12) United States Patent
Durlach

(10) Patent No.: US 9,904,500 B2
(45) Date of Patent: Feb. 27, 2018

(54) CHOREOGRAPHY OF KINETIC ARTWORK VIA VIDEO

(71) Applicant: David Milton Durlach, Somerville, MA (US)

(72) Inventor: David Milton Durlach, Somerville, MA (US)

(*) Notice: Subject to any disclaimer, the term of this patent is extended or adjusted under 35 U.S.C. 154(b) by 191 days.

(21) Appl. No.: 14/742,595

(22) Filed: Jun. 17, 2015

(65) Prior Publication Data

US 2015/0370520 A1    Dec. 24, 2015

Related U.S. Application Data

(60) Provisional application No. 62/013,844, filed on Jun. 18, 2014.

(51) Int. Cl.
| | |
|---|---|
| *G06F 3/14* | (2006.01) |
| *G06T 11/00* | (2006.01) |
| *G06T 11/60* | (2006.01) |
| *G09G 5/00* | (2006.01) |

(52) U.S. Cl.
CPC .............. *G06F 3/14* (2013.01); *G06T 11/001* (2013.01); *G06T 11/60* (2013.01); *G09G 5/00* (2013.01); *G09G 2340/0492* (2013.01); *G09G 2370/10* (2013.01)

(58) Field of Classification Search
CPC ....................................................... G06T 11/001
USPC ............................................................ 345/581
See application file for complete search history.

(56) References Cited

U.S. PATENT DOCUMENTS

| | | | | |
|---|---|---|---|---|
| 6,718,231 B2* | 4/2004 | Konno | .................. | B25J 9/1671 379/88.03 |
| 7,440,819 B2* | 10/2008 | Morel | .................. | B25J 9/1671 345/424 |
| 2015/0287291 A1* | 10/2015 | Regnier | ............... | G10H 1/0016 455/502 |

* cited by examiner

*Primary Examiner* — Yuehan Wang

(57) ABSTRACT

A software environment for kinetic artwork choreography, employing video as the controlling data stream, and conveniently allowing fine-grained manipulation of motors, lights, and other diverse artwork elements. Choreography video may derive from a file, camera, network, streaming screen capture, etc. Using the latter functionality, choreographies may be created interactively using standard, user-familiar, video/animation creation tools, thereby providing a rich graphical interface and many WYSIWIG (What You See Is What You Get) elements. Mappings from video frame pixel content to particular outputs such as color, rotation angle, artwork device element identifier, etc., are configured through flexible templates and configuration files.

16 Claims, 17 Drawing Sheets

FIG. 3D

This is a CONFIGURATION "*Global Command Frame*", denoted by the little red square in the upper left of this canvas.

Here we indicate that musical accompaniment begins on choreography frame 1.
[ STARTAUDIO(1) ]

Configuration Frame: Global Command Ex. 1

FIG. 5A

From: "ChoreographyStructureAndDataFormat.xls"  Tab: "ChoreoSysCMD-ChoreoConfig"  (a)

| | | | |
|---|---|---|---|
| This sheet describes the Choreo System Command packet (typically created by the DVP) that configures the receiver (DPR) to then be prepared for streaming choreo data thereafter. | | | |
| Field Description | Field size and type | Example | Notes |
| Number bytes in packet  *(Because this frame is sent only once in the beginning, we need not overly worry about packet size.)* | 4 byte int | 128 | This number of bytes will be used to determine when we are done going through grey-background-delineated repeated choreo types. |
| Type of packet | 1 byte | CHOREO_SYSTEM_PACKET *(This is not just an example, but exactly what must be here.)* | 1 for RECEIVERAPP_PACKET, 2 for CHOREO_SYSTEM_PACKET, 3 for CHOREO_FRAME_PACKET |
| Enumated Message Subtype | 2 byte int | CHOREOSHAPECONFIGURATION | CHOREOSHAPECONFIGURATION (May be more in the future.) |
| See below for subtype-dependent data. | | | |

FIG. 5B

From: "ChoreographyStructureAndDataFormat.xls"  Tab: "ChoreoSysCMD-ChoreoConfig"  (b)

| Data structure for each 2 byte int message type ||||||
| Command | Following Fields | Datatype | Units | Example | Notes |
| --- | --- | --- | --- | --- | --- |
| CHOREOSHAPECONFIGURATION | | | | | Shaded boxes below repeated N times. (Termination determined by hitting end of packet size.) |
| | Choreography type: GRY, RGB, ROT, XYD  *Specific choreo type, like GRY, may not be contiguous overall (e.g., may have GRY item, then ROT, then GRY array, say).* | 2 byte int | N/A | ROT | Note 1: Custom DMX fixures etc. (re number potentially needed), are a separate issue from this 2 byte type, which relates to the video processing side.  Note 2: Type of Shape determines both number of runtime values associated with said Shape, and their data type as well. |
| | Single or array-starting, Shape ID | 4 byte int | N/A | 3 | If starting value for array, remaining values will be assigned in ascending sequential order. And, starting value for each entry itself also ordered in ascending order. |
| | Number of elements N of this Type immediately following as part of Shape array. | 4 byte int | N/A | 20 | 1 if scalar or array of size 1 (essentially the same), up to N being reasonably large - e.g., easy to have massive RGB arrays. |

FIG. 5C

From: "ChoreographyStructureAndDataFormat.xls" Tab: "ChoreoSysCMD-ChoreoConfig" (b)

| | | | | | |
|---|---|---|---|---|---|
| | Enumerated Hardware device | 4 bytes | N/A | 1 | E.g., ArduinoCore might be 1. Note that this enumeration is not fixed, but dynamically created on the Video Processor end by (a) SupportedHardware.txt and (b) ShapeToHardwareDeviceMapping.txt. |
| | Enumerated Device Output Description | 2 bytes | N/A | 2 | E.g., 1 means MagnetCurrent, 2 means LightBrightness, etc. Ditto to above in terms of dynamic creation and enumeration documenting. |
| | Mapping of ShapeID element 1, value 1, to Hardware Channel X | 4 byte int | N/A | 1 (X=1) | Maps Choreo ShapeID to Hardware Channel Number. (If identical, then index = contents; both 1-based.) As many entries as there are Elements. (A Shape Array, therefore, must be of single Hardware Device and Parameter, but may have many channels used.) |
| | Mapping of ShapeID element 1, value 2 (if such - e.g., in XYD or RGB shape) to Hardware Channel Y | 4 byte int | N/A | 5 (Y=5) | |
| | ... | | | | |
| | Mapping of ShapeID element N, value 1, to Hardware Channel Z | 4 byte int | N/A | 3 (Z=3) | |
| | *Repeat above shaded items as many times as necessary* | | | | |

FIG. 5D

From: "ChoreographyStructureAndDataFormat.xls" Tab: "Choreo Per-Frame Data"

| colspan="4" | This sheet describes each Choreo Values packet (typically created by the DVP), typically one per frame, that streams to TCP Receiver (DPR). |
|---|---|---|---|
| Field Description | Field size | Example | Notes |
| Number bytes in packet (includes this field itself). | 4 byte int | 128 | This data is sent every frame, so minimizing packet size important. |
| Type of packet | 1 byte | CHOREO_FRAME_PACKET  This is not just an example, but exactly what must be here. | 1 for RECEIVERAPP_PACKET, 2 for CHOREO_SYSTEM_PACKET, 3 for CHOREO_FRAME_PACKET |
| Enumated Message Subtype | 2 bytes | CHOREOVALUES | At the moment, CHOREOVALUES is the only value. |
| Limit all values to 32 bit (4 bytes) vs. 64 bit (8 bytes). | 1 byte | 32 | Value either 32 or 64. Reason for having 32 is to address low end receiver uPs with short choreograpy etc. |
| Frame Number | 8 byte int | 22 | 1-N |
| Goal Frame Period, us | 4 byte int  Can be just 4 bytes if 32 bit target limit flag set. | 33000 | 30fps (Running sum at receiver end will handle processing time issues etc. to be sure there is no accumulated error.) |
| Microsecond time stamp of when the frame was _serialized for sending_. (There can be buffer and transmission delays.) | 8 byte int  Can be just 4 bytes if 32 bit target limit flag set. | 3178899999  Can be just 4 bytes if 32 bit target limit flag set. | Microseconds since the start of the choreo stream. |
| Audio sample (if any) that frame should (start being) displayed on. | 8 byte int | 48000 | |

FIG. 5E

From: "ChoreographyStructureAndDataFormat.xls"  Tab: "Choreo Per-Frame Data"

| Value Change Threshold Bits (1 means changed more than threshold and thus present in following values list; 0 means not that far changed and thus absent from following list). | As many bytes as are needed to have enough bits to cover ALL choreography elements as specified in config SDF frame. | (Binary) 11000001 00000000 | Leftmost bit in first byte corresponds to the first Shape element value etc. |
|---|---|---|---|
| Choreo Values matching Config frame structure previously sent once at the beginning. | Determined by choreo type, iterated by number of items in array. | If scalar GRY, just 1 byte. If array of RGB values, 3 bytes per array entry, etc. No Choreo Type or ShapeID info, as that was contained in config frame. | |

| Data structure for each choreo type ||||
|---|---|---|---|
| Field type | Datatype | Value / Units | Notes |
| GRY | uchar, 1 byte | [0, 255] | Will divide by 255 on receiving end to normalize. |
| RBG | R: uchar, 1 byte<br>G: uchar, 1 byte<br>B: uchar, 1 byte | Each [0, 255] | Will divide by 255 on receiving end to normalize. |

FIG. 5F

From: "ChoreographyStructureAndDataFormat.xls"  Tab: "Choreo Per-Frame Data"

| ROT | qint64, 8 bytes | signed: 1/10 degree | Can be just 4 bytes if 32 bit target limit flag set. |
|---|---|---|---|
| XYD | X value: qint32 4 bytes y value: qint32 4 bytes | signed: 1/(2^32-1) units. | Will divide by (2^32-1) on receiving end to normalize. |
| Repeat shaded items in above grid as many times as necessary. | | | |

FIG. 5G

From: "ChoreographyStructureAndDataFormat.xls"  Tab: "TCPReceiverMessage"  (a)

| This sheet describes TCP Receiver App (DPR) Message Packet. | | | |
|---|---|---|---|
| Field Description | Field size | Example | Notes |
| Number bytes in packet | 4 bytes | 128 | |
| Type of packet | 1 byte | RECEIVERAPP_PACKET | 1 for RECEIVERAPP_PACKET, 2 for CHOREO_SYSTEM_PACKET, 3 for CHOREO_FRAME_PACKET |
| Enumated Message Subtype | 2 bytes | Exit  *[This is not just an example, but exactly what must be here.]* | INITIALIZE_HARDWARE, EXIT, MEMORY_REQUIRED, END_CHOREORUN  MEMORY_REQUIRED and INITIALIZE_HARDWARE are typically called before every choreo run. END_CHOREORUN is called at completion of each choreo run. |
| Data based on above Command type sometimes follows - see below. | | | |

FIG. 5H

From: "ChoreographyStructureAndDataFormat.xls"  Tab: "TCPReceiverMessage"  (b)

| Command | Following Fields | Datatype | Value / Units | Notes |
|---|---|---|---|---|
| Data structure for each 2 byte int message type sent-to/received-by DPR | | | | |
| INITIALIZE_HARDWARE | | | | |
| | (none) | | | |
| EXIT | | | | |
| | (none) | | | |
| END_CHOREORUN | | | | |
| | (none) | | | Frees memory, among other things. |
| MEMORY_REQUIRED | | | | |
| | Required bytes for choreo structure (singleton sending). | 4 bytes | bytes | |
| | Required bytes for choreo values (the same max for every frame). | 4 bytes | bytes | |
| | Max bytes required for audio packet sending. | 4 bytes | bytes | |
| | Max required bytes for any other message types that Receiver may receive. | 4 bytes | bytes | Small value covering, for example, messages like this |

Data in shaded cells above is command-specific.

CHOREOGRAPHY OF KINETIC ARTWORK VIA VIDEO

NOTES

Please review the included PPA in its entirety, including legend tables etc., as essentially all is relevant.

LEGEND TO SUPPLEMENT THE MORE EXTENSIVE LEGEND ALREADY PROVIDED WITHIN THE PPA BELOW

PWM==Pulse Width Modulation. (Industry Standard Term)
AOI==Area Of Interest. (Industry Standard Term)
XML==Extensible Markup Language. (Industry Standard Term)
ASCII==American Standard Code for Information Interchange. (Industry Standard Term)
LAN==Local Area Network. (Industry Standard Term)
WAN==Wide Area Network. (Industry Standard Term)
LocalHost==Refers to the local computer that a program is running on. (Industry Standard Term)

BACKGROUND OF THE INVENTION

Please refer to the following sections of the PPA below: "Background", items 1-5.

SUMMARY OF THE INVENTION

Please refer to the following sections of the PPA below:
"Overall concept".
FIG. 2A through 2E, overview illustrations.
FIG. 4A through 4D, DVP screen captures from functional, running application.
"Key innovations/features".
"Background", items 6.

BRIEF DESCRIPTION OF THE DRAWINGS

Please refer to the Drawings section for the following:
FIG. 2A is an overview of the ChoreoV environment.
FIG. 2B is a sample configuration: a supported microcontroller+custom artwork/device.
FIG. 2C is a sample configuration: PC/MAC+custom or standard artwork/device.
FIG. 2D is a sample configuration: 2 PC/MACs+custom or standard artwork/device.
FIG. 2E is a sample configuration: ChoreoV choreography copied onto a flash memory card.
(Note:
In FIG. 3A-3F the green text is an integral part of the figures not secondary annotation. The system ignores green, thus enabling the user to add notes.)
FIG. 3A is a Shape Definition Frame (SDF), Ex. 1.
FIG. 3B is a dynamically annotated SDF from Ex. 1.
FIG. 3C is a second SDF example.
FIG. 3D is a Global Command Frame (GCF), Ex. 1
FIG. 3E is a Choreography Data Frame (CDF) associated with Ex. 1.
FIG. 3F is a dynamically annotated CDF associated with Ex. 1.

(Note:
FIG. 4A shows parsing SDF.
FIG. 4B shows parsing SDF with display updated from previous figure.
FIG. 4C shows processing CDF with additional status window present.
FIG. 4D shows processing CDF with different values and additional status window present.
(Note:
FIG. 5A-5H show the following from ChoreographyStructureAndDataFormat.xls: Example/preferred-embodiment specification for choreography structure packets, choreography runtime value packets, DPR configuration commands, etc.)
FIG. 5A is ChoreoSysCMD-ChoreoConfig tab (a).
FIG. 5B is ChoreoSysCMD-ChoreoConfig tab (b) part 1.
FIG. 5C is ChoreoSysCMD-ChoreoConfig tab (b) part 2.
FIG. 5D is Choreo Per-Frame Data tab part 1.
FIG. 5E is Choreo Per-Frame Data tab part 2.
FIG. 5F is Choreo Per-Frame Data tab part 3.
FIG. 5G is TCPReceiverMessage (a)
FIG. 5H TCPReceiverMessage (b)

DETAILED DESCRIPTION OF THE INVENTION

From the PPA

Figure 1:
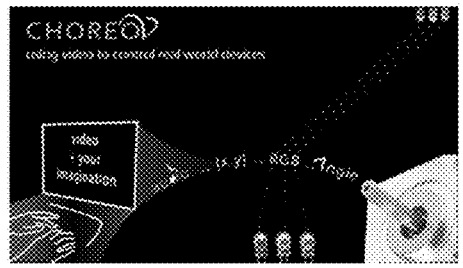
FIG. 1 is an illustration of the ChoreoV business card.
(Note.
Figure 2A:
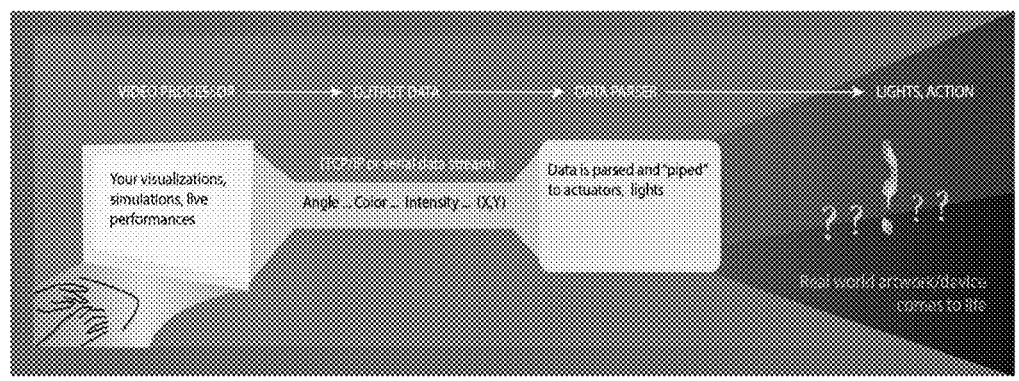
In FIG. 2A-2E "VIDEO PROCESSOR" is the DVP referred to in this document, and "DATA PARSER" is the DPR referred to in this document.)
Figure 2B:
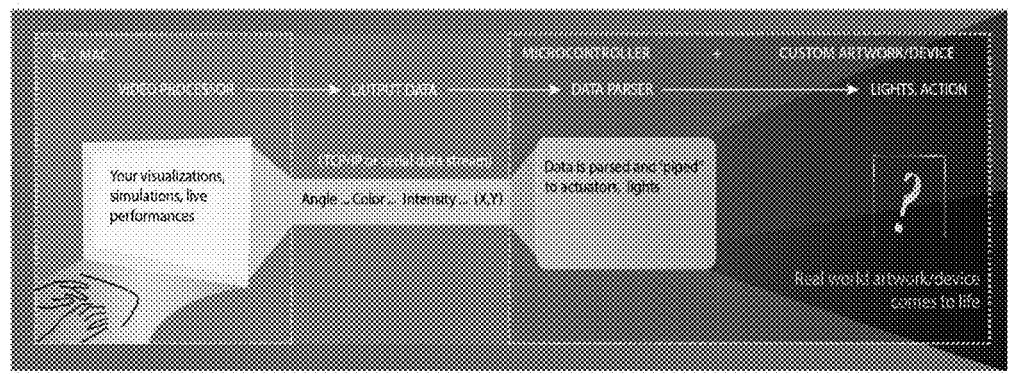
Figure 2C:
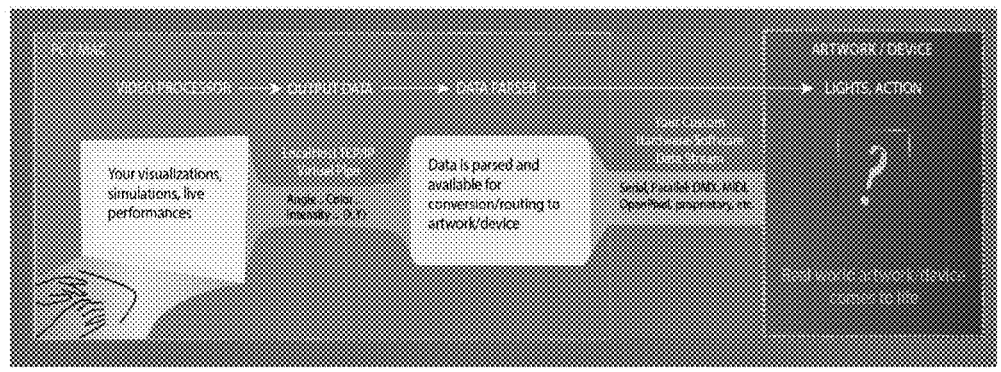
Figure 2D:
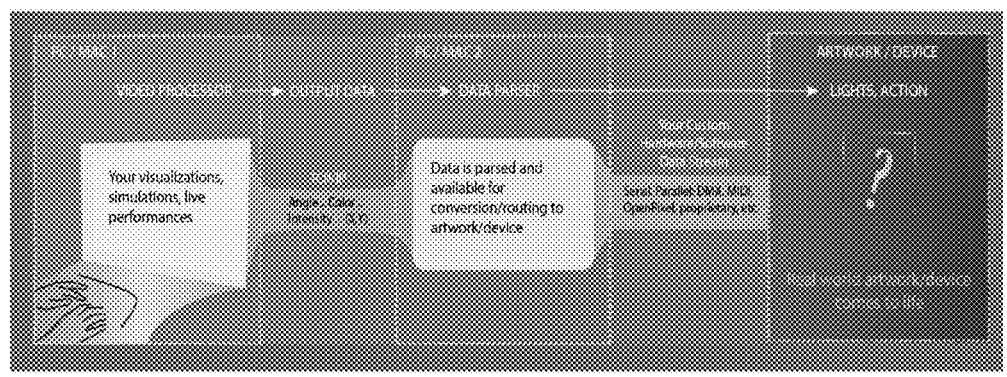
Figure 2E:
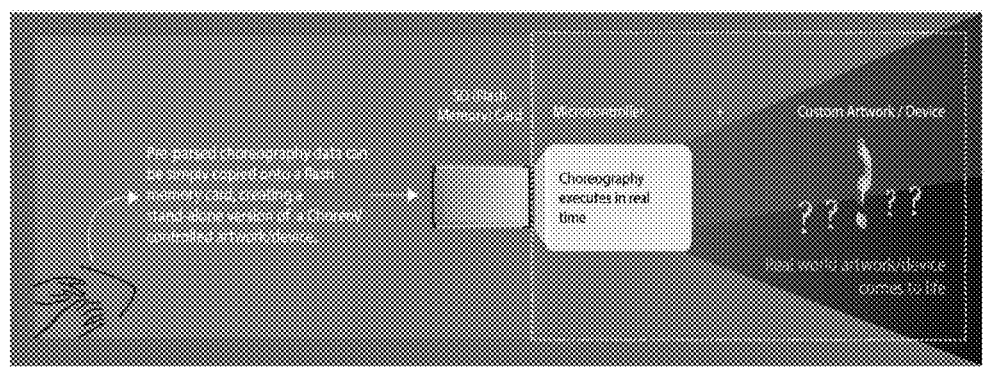

Please refer to the following sections of the PPA below:
"Overview of functional blocks and dataflow".
"Descriptions and implementations".
"Serialization, parsing, and routing of choreography data".
"Concluding notes".
FIG. 4A through 4D, DVP screen captures from functional, running, application.
FIG. 5A through 5H, ChoreographyStructureAndDataFormat.xls: example/preferred-embodiment specification for choreography structure packets, choreography runtime value packets, DPR configuration commands, etc.
"SupportedHardware.txt".
"ShapeToHardwareDeviceMapping.txt".
"Preferences.txt".
The above items cover the vast majority of the core elements of importance.
Minor Additional Information Updating Preferred Embodiments as Previously Described within the PPA
Note: Items below do not introduce new material unobvious to a person having ordinary skill in the art once they had read the previously submitted PPA, and indeed in a number of cases are already explicitly noted in the PPA. Because of this:
  Items do not require detailed explanation as to implementation beyond what has already been provided.
  Items do not impact use of the priority filing date of the PPA.
1) Text based configuration files have been edited to conform to XML standards.
2) The need for a separate virtual screen capture utility has been in most cases removed via simply building that functionality into the core DVP application.
3) In addition to the PPA-described small upper left colored rectangle identifying the type of Configuration Frame (COF), a robust alternative is to have individual frames as separate-file still images, optionally in a dedicated folder, where the image's filename (or folder name) determines whether it is a Shape Definition Frame (SDF), a Global Command Frame (GCF), etc. If multiple COFs are needed, files may be sequentially named accordingly. It has often been found in practice that a single SDF is sufficient for artwork choreography.

4) It has indeed been found useful, as already mentioned as an option in the PPA, to have the output device control choreography data stream be in Hex (ASCII) vs. Binary, in order that single "special" characters may be included in the data stream to initiate actions upon receipt by the DPR (such as global system reset).

5) As already mentioned in the PPA, a second simpler data format requiring less parsing complexity on the DPR side has been added as an option. In this configuration, for each choreography data element, the DPR transmits: a hardware device ID, a hardware device channel number, a CHS choreography type (rotation, rgb color, etc.), followed by the value(s) for said choreography type.

6) Rather than have the mapping from Choreography Shape (CHSs) channel numbers to output artwork hardware device channel number be explicitly conveyed within the data stream, instead said mapping may be usefully applied on the DVP side before sending, thus allowing the transmitted data packet to be more compact, simply including a starting output channel ID, and with the implicit shared understanding between DVP and DPR that remaining channel numbers within an array of CHSs are contiguous and monotonically increasing.

7) Bandwidth limiting on the DVP sending end, by frames per second or bytes per second, has been implemented. In addition, when said bandwidth limit is reached, there is the option to either skip frames such that each source frame that is not skipped is sent at the proper time, or not skip and instead simply slow down the average sending fps such that all frames get behind time-wise.

8) It was found desirable to remove the "SupportedHardware.txt" and "ShapeToHardwareDeviceMapping.txt" files and replace them with:

a) Having the CHS-associated OCRed text be of the form, for example, "ROT>DEV#1", meaning that (in this example) the CHS is a ROTation element and its data should be piped to Hardware Device 1. One or more (depending on whether the user has specified an array of channels or a single element) channel numbers are then auto-assigned to this CHS, contiguously from 1-N.

. . . combined with . . .

b) A configuration file that specifies input-to-output hardware device channel mapping, an example entry for which is (mapping auto-assigned channel 1 to output channel 101 and auto-assigned channel 2 to output channel 100 for hardware device 1):

```
<HRDW_DEVICE_CHANNEL_MAP HrdwDeviceID="1">
    <MAP_CHANNEL autoAssignedShapeChannel=
    "1">101<MAP_CHANNEL>
    <MAP_CHANNEL autoAssignedShapeChannel=
    "2">100</MAP_CHANNEL>
</HRDW_DEVICE_CHANNEL_MAP>
```

9) An example XML DVP data stream output port configuration file entry that clarifies/evidences items 3-6 (and more):

```
<HRDW_DEVICE_ID_RANGE HrdwDeviceIDStart="1"
HrdwDeviceIDEnd="4">
    <OUTPUT_PORT PortType= "TcpIp">
        <IP_ADDR>192.168.46.29</IP_ADDR>
        <IP_PORT>5006</IP_PORT>
        <MS_PORT_COMMUNICATION_MSTIMEOUT>1000-
        </MS_PORT_COMMUNICATION_MSTIMEOUT>
        <DISABLE_FOR_RECEIVERFREE_DEVELOPMENT>
        No</DISABLE_FOR_RECEIVERFREE_DEVELOPMENT>
    </OUTPUT_PORT>
    <OUTPUT_STREAM_TYPE>SimpleHex-
    </OUTPUT_STREAM_TYPE>
    <FLOWCONTROL
ControlType="Handshake_ChunkSizeReceiverSpecified">10-
</FLOWCONTROL>
    <BANDWIDTH_LIMIT LimitType="FPScap"
    SkipFrames="False">1</BANDWIDTH_LIMIT>
</HRDW_DEVICE_ID_RANGE>
```

The XML entry above:
Specifies that the range of CHS hardware device IDs that the following XML block applies to is 1-4.
Specifies that all related data will be piped to a port of TCP/IP type.
Specifies a specific IP address of 192.168.46.29.
Specifies a specific port of 5006.
Specifies the time duration beyond which a port communication timeout error will be triggered of 1000 ms.
Specifies that the output port must actually be present to avoid triggering a program error.
Specifies that the output stream type will be encoded as hex values, and will be of a simple to parse type (vs. more bandwidth-efficient but more difficult to parse).
Specifies that communication between the DVP and DPR will involve handshaking, and that the packet size between each handshake will be determined by the DPR, except for the initial startup communication packets which will have size 10.
Specifies that the DVP has a choreography data sending limit of type FPS, with value 1 fps, and that no frames will be skipped.

10) Note that claims related to the kinetic artwork simulator are supported by the PPA under the section "Virtual microcontroller add-on".

An example XML file entry that associates visualizer elements with incoming choreography runtime data:

```
<VISUALIZER ObjectName="BlackNumber1"
FileOrFolderName="NumbersAndBackgroundRoom/1black.png">
    <ROTATION RotationOriginOffsetFromCenterX="+0.5"
RotationOriginOffsetFromCenterY="0" RotationOriginOffsetType=
"NormalizedImageSize" DeviceID="1" Channel="1"
ParamNumber="1" SlopeM=".1" >
    </ROTATION>
</VISUALIZER>
```

The XML entry above:
Specifies a visualization object name of "BlackNumber1".
Specifies an on-disk folder/filename for it of "NumbersAndBackgroundRoom/1black.png".
Specifies a rotation transformation to it with:
Origin of rotation in X direction of 0.5.
Origin of rotation in Y direction of 0.

Origin offset normalized relative to the bounding box of the visualization object in question.

Specifies that the choreography runtime data stream element controlling this visualization object is DeviceID 1, Channel 1. Also specified is that a linear transformation of (the form Y=mX+b) is applied to the specified data stream value before applying it to the visualization object's rotation angle, with parameter m=0.1 (and implied "b" of 0).

Substantive Additional Information Updating Preferred Embodiments as Previously Described within the PPA that does Introduce New Material and Thus Cannot Use the Priority Filing Date of the PPA (This affects claim 13 only.)

1) Dynamically moving CHSs:

Background: We realized since submitting the PPA that allowing the runtime choreography value(s) of one or more CHSs to affect the runtime position, size, or shape of one or more other CHSs would, for certain artworks, be of significant value. For example, we might wish to have an artwork element composed of an RGB light secured to one end of a bar, where the other end of the bar was secured to a motor shaft, where both motor shaft angle and RGB light value were choreographed. In such a situation, a fixed location RGB CHS would make it more difficult for the user to create a choreography control video that substantially visually mirrored the appearance of the actual artwork in operation (because the RGB CHS would not follow a spatially moving onscreen RGB light representation at the end of the bar, yet that is what would be best representative of the physical artwork's actual appearance).

Because of this, we added code, and a configuration file, to allow parameters of one or more CHSs to be affected by the runtime choreography values generated by one or more others. One preferred method for this is described below:

a) Have a file specifying the linkage, one possible format of which is provided below:

```
<VP_MOVINGSHAPES_LINKAGE>
    <FOLLOWER HrdwDeviceID="3" ShapeChannel="1">
        <ACTUATOR HrdwDeviceID="1" ShapeChannel="1">
            <LINEAR_SCALING SlopeM="0.5"
            YoffsetB="0.0"></LINEAR_SCALING>
        </ACTUATOR>
    </FOLLOWER>
</VP_MOVINGSHAPES_LINKAGE>
```

Explanation of XML above:

"VP_MOVINGSHAPES_LINKAGE" specifies a specific desired linkage.

"FOLLOWER HrdwDeviceID="3" ShapeChannel="1"" specifies the Follower CHS that will be slaved to the runtime output values from another CHS.

"<ACTUATOR HrdwDeviceID="1" ShapeChannel="1">" specifies the Actuator CHS that the previously-specified Follower CHS will track.

"<LINEAR_SCALING SlopeM="0.5" YoffsetB="0.0">" specifies the linear scaling (in Y=mX+b form) applied to the Actuator CHS output value before it is passed to the Follower CHS as control signal for position, size, or shape.

b) Separate CHSs into two groups—Actuators and Followers.

c) Process the Actuators group first in order to determine all their runtime choreography values.

d) Process the Followers group second, using the values generated in the step above to transform each Follower CHS.

e) The thoughtful reader may note that the above XML file structure does not specify which attribute of the Follower the Actuator value is going to control. That is because a simplified form is provided here, where it is assumed that it is rotation of the Follower about the Actuator's visual center of mass that is to be performed. Adding syntax and functionality to allow control of additional parameters is straightforward to one of ordinary skill in the art, as is implementing the aforementioned rotation. [Since all CHSs are stored as polygons with (x,y) coordinates for all vertices, performing transformations on said polygons such as rotation, scaling, translation etc. are all well understood in the art.]

Notes Regarding Claim Language:

1. "Kinetic artwork" is intended to refer to any combination of electromechanical elements (motors, electromagnets, mechanical linkages, etc.), lighting elements (LEDs, incandescent bulbs, conventional computer screens, lasers, etc.), audio (sound generators and speakers), etc., as well as potentially more esoteric elements such as controllable smell, chemical/biological composition, etc.

2. "Choreography" is intended, in both noun and verb form, to refer to sequences of artwork motions/appearance whose intent and/or effect is to emotionally impact the viewer, as distinguished from movements produced by conventional industrial motion control systems, where fine-grained specification of motion dynamics sufficient to readily allow conveying to the viewer feelings such as "curiosity", "fear", "joy", etc. is either prohibitively tedious or impossible.

"Choreography" is furthermore intended to mean substantially explicit specification of kinetic artwork motions—just as the word means when referring to human dancers. In other words, the connection between what is seen in the control video and the data streaming to the artwork should be substantially direct and clear. For example, a specific RGB colored area (CHS) within the video would send corresponding RGB values into the data stream pipeline (possibly adjusted by minor "tweaks" related to gamma, brightness, contrast, hue, etc.), a CHS rotation element would send corresponding angles into the data stream pipeline (again possibly adjusted by minor "tweaks" such as correction for servo motor motion variance due to component value manufacturing variances, etc.). This is contrasted with, for example, a complex algorithm that attempted to determine (say) the number of faces in the video frame and then spin an artwork motor element faster based on the resultant face count. We consider such an indirect connection between video content and artwork motions/appearance an interesting example of interactive art, but not what we mean by "choreography".

3. "Video" is intended to refer to a stream of image frames making up a "movie", whether from a disk file, a live camera view, streaming screen capture, or some other source—substantially as per the normal usage of the word.

4. "Template" is intended to refer to a specification of how the DVP computer software is to interpret incoming pixel data. Typically this would include specification of both Area(s) of Interest within each frame to be examined (which could be the entire frame), and from within said area(s), whether angle, color, etc. is to be extracted.

It is highly preferred that said templates be simple to create and layperson-readable/understandable—which typically would mean they are graphic in nature. The graphic SDFs detailed in the Specifications show one preferred embodiment of such. It is also to be understood that such templates are separate from the main DVP application code (existing for example as an electronic file) for ease of creation, editing, sharing, etc.

5. "Appropriate for direct device control" is intended to refer to data formats commonly understood to be naturally suited to controlling specific kinetic artwork elements. In the case of a motor, this is typically a value specifying one of either angle or velocity. In the case of RGB LED lights, this is typically a triplet of Red, Green, and Blue values. In the case of x-y pixel arrays (e.g., a typical computer screen), this is typically the raw RGB LED pixel data itself, with no conversion. In most cases (not including the last), said data format has dramatically lower bandwidth than the raw pixel data.

6. "Forward/forwarding said data" is intended to refer to streaming data via Ethernet (wired or wireless, LAN, WAN, Internet), serial, Firewire, Thunderbolt, or other suitable protocol, writing to disk file or flash memory storage device, sending to another process running on the same computer as the main DVP application via Ethernet LocalHost or Shared Memory, etc.

7. "Real-time" is intended to refer to an overall frame-to-artwork processing pipeline with sufficiently low latency that changes in current video frame pixel data, onscreen or otherwise, are reflected in artwork motions, appearance, etc. quickly enough to be experienced by the user as "substantially immediate" in response to their actions during interactive interactions with the ChoreoV environment.

Bandwidths should similarly be sufficient to allow a continuous frame update rate sufficient to convey the appearance of "substantially smooth" artwork motion.

8. "Code" simply means elements of the software application—processor instructions—that perform the described functionality.

9. "Computer" is meant to refer a device such as a standard desktop PC or Mac, as well as the new breed of tiny computers such as the Raspberry Pi, or other computational device with similar functionality. While not in all configurations required, typically such systems would include a keyboard or equivalent, mouse or equivalent, screen or equivalent, data/file storage device or equivalent, output port (network, serial, etc.), etc.

10. "Type of choreography information" is intended to refer to such things as RGB color, rotation, intensity, etc. as described in detail elsewhere in this document.

BEGINNING OF PROVISIONAL PATENT APPLICATION (PPA) AS PREVIOUSLY FILED (Modified only to the extent required by USPTO NOTICE TO FILE CORRECTED APPLICATION PAPERS dated Jun. 29, 2015, which simply mandated formatting changes such as moving the Drawings from being interleaved in Specification area to separate Drawings area.)

LEGEND

ChoreoV==Name of invention: Choreography via Video.
CV==Computer Vision. (Industry Standard Term)
OpenCV==The $3^{rd}$ party open source CV library at www.opencv.org.
OCR==Optical Character Recognition. (Industry Standard Term)
FPS/fps==Frames Per Second. (Industry Standard Term)
DVP==Desktop Video Processor: The key element of the ChoreoV environment, converting video frames to choreography[1] data stream(s), serializing them, and sending them onward (as well as providing application menus, player controls, on-screen debugging information and annotations, etc.).

[1] By "choreography", we mean a time-based visual-appearance-specification data stream. For example, it could be a stream of values specifying the (evolving) color patters of an array of RGB full color LEDs, angles of motor shafts over time, etc. In other words, we use "choreography"/"choreographed" in a manner very similar to that common usage when applied to human agents, only we apply it to electromechanical devices. (Should electro-biological art become similarly (and ethically) available for such choreography, we would mean it to refer to that too. However, we think that if such occurs, it will likely be after any utility patent using this provisional patent for priority date has expired . . . )

CVP==Computer Vision Processor: A CV-employing visual parser DVP code block that interprets all video frames.
DPR==Data Packet Receiver: A choreography data packet receiver and parser module.
SDF==Shape Definition Frame: An initial video frame that defines various choreography structures and parameters including shape areas, choreography types, and shape ID numbers.
GCF==Global Command Frame: An initial set of video frames that specify system configuration information different than and in addition to that provided by the SDF.
CMF==CoMment Frame: A (typically initial) video frame that is ignored by the system entirely.
COF==COnfiguration Frames: Video frames that define choreography structure (vs. runtime data values) and which include SDFs and GCFs.
CDF==Choreography Data Frame: Video frames containing pixel data that, based on prior SDF (and possibly GCF(s)), provide/generate a stream of choreography data for device control.
CHS==CHoreography Shapes: Within-video-frame areas specified by user[2], and analyzed by the DVP's CVP element.

[2] Typically created using a video editor, potentially importing from graphics program such as Adobe (www.adobe.com) Illustrator/Photoshop, etc.

Overall Concept

1. ChoreoV™ stands for Choreography (via) Video.
2. The invention is targeted for aesthetic implementation in art-related contexts where complex control of digitally controlled hardware elements (lights, motors, etc.) is required. Advertising and promotional displays, including moving signage, and theater of all types, are other obvious, immediate application areas.

Primary initial target applications are thus those of choreographed/kinetic artworks, moving signs (be they LED, with electromechanical components, or a combination), ambient environmental highlighting, moving theater set elements, etc.

3. The invention greatly simplifies the creation/implementation of the stream of digital/analog commands required in performing complex machine "choreography" (controlled motion, lighting, etc.), by eliminating the need for line-by-line, node-by-node, millisecond-by-millisecond code-level programming of action. Instead, the invention allows real-time, global, synchronized control of hardware systems through the streaming of automatically generated commands based on user-specified interpretation of user-produced (or other-produced or live camera) video imagery.

4. The invention is comprised of a software system that (in one preferred embodiment) dynamically[3] extracts information from video imagery in real-time, and then pipes that data onward via TCP/IP, serial, or the like[4], for the purpose of controlling color, light intensity, (x,y) coordinates, angle information, and additional such parameters, in physical real-world devices.

[3] While dynamic processing of video at choreography runtime is a major intended use, the system is not limited to this—the generated lower-bandwidth (lower than video) data stream can be stored on disk, flash drive, etc., for later lower-computationally-intensive (or higher fps) playback without any video.

[4] Devices could also be controlled directly without the TCP/IP serial communication pipe, but in general that is a less flexible configuration.

5. The current preferred embodiment of the invention is a software tool coded in C++ with functional members that include:
   a. Within the DVP:
      i. An element of the CVP module that receives an initial video Shape Definition Frame (SDF), detailing what kinds of visual choreography data to expect at runtime, where in each video frame to expect to find that data, and what meaning that data has.
      ii. An element of the CVP module that, at choreography runtime, and based on information from (a), parses incoming video Choreography Data Frames (CDFs) at high speed[5], converting said data into compact binary packets, that are then piped onward via TCP/IP, serial connection, etc.

[5] Typically in excess of 30 fps.

b. A receiver module or modules (the DPR(s)) that accepts said packets and, using the information from (a), parses them to extract the relevant choreography commands/data.[6]

[6] In typical preferred embodiments, the receiver is sent information once, prior to runtime, to define the format of the data packets it will receive (this is the SDF). It then, at runtime, simply receives the raw data. This saves significantly on required transmission bandwidth.

i. A sender module within the DPR that takes the data from (b), optionally performs data-format conversions on it for compatibility with receiving display hardware, and routes it to real-world hardware devices.

6. The device-controlling video frames can derive from:
   a. A pre-rendered stored video file (QuickTime mov file, avi file, etc.) generated from scratch by an animator/video-producer, of a real-world object like a bouncing red ball, or a mixture.
   b. A dynamic view of the screen via live capture[7] of (say):

[7] Many existing packages for such "virtual screen capture cameras" exist—for example ScreenCamera from PCWinSoft http://www.p-cwinsoft.com/screencamera, VCam from EZE http://www.e2esoft.cn, etc.

i. A video editor during the editing process itself. This allows, for example, the color of a physical RGB LED/light to dynamically track/match the color of an onscreen shape as (say) the user changes its hue with a video editor slider or, similarly, a motor shaft to dynamically track the rotation of an onscreen dot around a center point as an angle variable in the video editor is adjusted.
      ii. On-screen graphics generated automatically from playing audio—such as the free "Visualizations" that come with Windows Media Player, etc. In this way, the color patterns of RGB LEDs—which could be organized in the form of a square matrix, a linear "string" wound around a Christmas tree, etc.[8]—would be automatically synchronized to the audio, matching the Visualization video's synchronicity to the audio.

[8] The SDF would define the spatial position of each LED, and thus the area of the Visualization video frame that was mapped to each physical LED. (I.e., each CHS would be spatially located where the physical LED was—or intentionally perturbed from that ordering, in order to create unusual "spatial distortions" between color locations in the Visualization vs. in the real world display.)

c. A live camera view of a scene containing elements of (changing) color, rotary motion, linear motion, etc. In this way, for example and using (say) a webcam pointed at a dark/black background with green rectangle boundary area defining border, and where an appropriate SDF has been previously defined and parsed:
      i. One could move colored disks on the ends of black sticks, in order to control the RGB colors of an array (orthogonal matrix, linear string(s) in arbitrary user-chosen curve, etc.) of LEDs.
      ii. Point and move a flashlight against the black background in a circular fashion around a SDF-pre-defined center point, in order to control the movement of a motor.
      iii. Wear white gloves and otherwise black clothes and move one's arms up and down, with shoulders pre-defined by a SDF as visual rotation centers, to control dual synchronized servo motor angles.
      iv. Attach a white ball on a black rod connected to a rotary bearing, hanging down in gravity, swinging back and forth. In this way, such a live streaming video would, with the ChoreoV invention, make a servo-motor-controlled robot arm move just like a pendulum in a gravitational field.[9]

[9] A properly constructed SDF—i.e., one with rotational choreography shape encompassing the swinging ball/rod, and with shape center at the bearing point—would define the bounding rotation area to examine, along with the virtual center, thus permitted dynamic processing of each pendulum video Choreography Data Frame (CDF).

v. Etc.

7. Includes an open data format standard[10] defining the output of the DVP (which is typically equivalent to the input to the DPR) specifying:

[10] See FIG. 5A through 5H, showing content from ChoreographyStructureAndDataFormat.xls.

a. The structure (layout) of a motion control data stream that will follow (choreographed lights, electromechanical actuators, etc.).
   b. The raw data stream itself
   This separation allows the raw data stream to be much lower in bandwidth than if its structure had to continually be passed as well as its instantaneous display element data, and is much more flexible than if an (implicit) structure were present but fixed.

8. Note that synchronized audio is understood to be an optional element of the ChoreoV invention. Such synchronization could range from:
   a. Simply starting audio playback at the same time as video playback. For example, playing a movie with synchronized audio in the QuickTime player, having the DVP process the video and stream choreography data live to the DPR, while audio plays in synchrony on the sender (DVP) end.

b. Starting audio playback and playback of pre-processed video stream choreography data (as file) at the same time.
c. Have the pre-processed video stream frame choreography data play back be locked to the current audio sample index of a playing audio file[11].
[11] Typically this would be handled within the DPR.
d. Interleave audio data along with video frame choreography data, either during initial processing of the video frames, or later reading previously processed choreography data from file, where synchronization is based upon the inherent neighbor-clustering of choreography and audio data.

BACKGROUND

While the ability to convert video data streams to RGB pixel values had been around for years—for example in large displays within sports stadiums—there are a number of features absent from such systems, and other similar ones in different market areas, that the ChoreoV environment addresses, including:
1. Ability to use video to not only control RGB full color LEDs (or other lighting technologies) but also angle/position/velocity of motors, (x,y) coordinates of a 2D linear display (artwork, router, plotter, etc.), and more.
2. Ability to specify the spatial mapping of the on-screen choreography objects to the physical display in a flexible and powerful manner.[12]
   [12] This is in stark contrast with say a sports stadium video-to-jumbo-LED-square-matrix-array display, which assumes an inflexible, 2D arrangement of LEDs in a plane.
3. Ability to use familiar video editors for device choreography:
   a. Resulting in a learning curve for many situations of near zero.
   b. Allowing use of commercial video editors, with rich feature sets resulting from tens of millions of dollars in development effort, to be employed for artwork choreography and lighting/motion control generally. (Including multiple tracks that can be turned off and on, key frames, ease-in/ease out of said key frames, time-reversal, etc.)
   c. Allowing video simulations of real-world-to-be installations (e.g., virtualizations/animations for proposals) to then be actually used in controlling the final, physical artwork.
4. Ability to separate the programming task from the choreography task in a natural manner, thus allow experts in each to contribute. More specifically, the invention allows even non-coders to directly create, test, and iterate, rich, complex, varied choreography.
5. Ability to employ dynamic "virtual camera" screen capture utilities such that, during the video production process, the artwork responds essentially instantly to user actions within the video editor (such as changing intensity or hue of a region, moving a dot around a fixed center to affect a motor angle, etc.)
6. Note that the power of the ChoreoV environment is not limited to 2D-focused video editors. 3D animation packages such as Maya from Autodesk[13] may also be used, where one simply renders views perpendicular to the display surface from different sides, and composites that into a "flat" 2D layout view that is then analyzed by the ChoreoV environment. For example, if one had two motors, one with shaft pointing north and the other pointing east, one would simple generate two time-synchronized views of the moving system, one looking south and one looking west, in order to generate a video that the ChoreoV environment could use to generate synchronized data streams for both motor shaft motion profiles.
[13] http://www.autodesk.com.

Overview of Functional Blocks and Dataflow
Notes
See FIG. 2A through 2E, overview illustrations.
Desktop Video Processor (DVP)
There is a Desktop Video Processor module that implements several conceptually separate steps, currently implemented in a preferred embodiment in C++ and employing the open source libraries: OpenCV[14] for computer vision analysis and Tesseract[15] for OCR:
[14] www.opencv.org
[15] https://code.google.com/p/tesseract-ocr/

Configuration Frames Processor
A code block that interprets COFs (configuration frames). COFs are composed of a SDF (shape definition frame) and optional GCFs (global command frames).[16]
[16] In a current preferred embodiment, configuration frames are defined by a small (say 10×10 pixel) colored square in the upper left of the frame.

A small blue square denotes a SDF (shown below).
A small red square denotes GCF (shown below).
A small green square denotes a CMF. (We have not included an illustration of a CMF because the CVP, once it detects the small green square, which is located in the same position as for the SDFs and GCFs blue/red squares that are illustrated and described below, simply skips over the frame entirely.)

The initial SDF video frame is of key importance, in that it defines the structure of the visual frame parser that will then interpret CDF's (choreography data frames) at runtime and convert them to low-bandwidth-transmittable, easy-to-interpret, numeric choreography data packets.

Choreography Frames Processor
A code block that selectively looks at the CDFs and, typically in real-time (e.g., at 30+fps)[17], using previously defined and stored structures generated by the Configuration Frames Processor above, extracts relevant choreography information and converts that information into a compact data packet.
[17] Note that while most situations will employ real-time analysis and immediate/streaming playback, because that provides the most immediate feedback to the choreographer, that is certainly not a requirement. Should there be a large number of choreography objects, this process could run at less than real time, where playback could then occur employing (for example) a file of this (relatively very compressed) choreography data, at speeds orders of magnitude faster than the original video frame processing step. Relatedly, should the update rate for the choreography data be desired/required to be much faster than 30 fps, a similar separation of video processing from later playback could occur, again allowing the playback to be much faster than the frame processing.

Data Packet Sender
A code block that streams above choreography data packets, via TCP/IP[18], Serial, or the like, to one or more Data Packet Receiver (DPR) modules.
[18] This TCP/IP data stream could be across a physical wire, wirelessly, or internally via LocalHost or the like.

One could also optionally stream this data to a file, for later parsing and playback, etc.
Data Packet Receiver(s) (DPR(s))
Input Modes
The Data Packet Receiver(s) should be understood to be runnable in several modes:
1. Receive and parse incoming data packets from the DVP in real-time.

2. Open a file (on disk, SD memory card, or the like) of previously stored packet data in similar (or identical) format to what would otherwise be sent in streaming fashion.

DPR Instantiation Options

The DPR typically can be embodied in several variations on a core theme:
1. Running on the same desktop machine as the DVP, receiving data from the DVP via (say) the LocalHost virtual TCP/IP link. At that point, the parsed choreography data could be:
   a. "Massaged" and sent onward to diverse devices, ranging from theater lights expecting standard DMX control signals, to custom artworks with microcontrollers or FPGA or ASICs as the "brain".
   b. Split up and sent in different forms (or the same form) to multiple devices/IP addresses, etc. (Particularly if data massaging done, it will often be more appropriate to do this on the DPR side rather than DVP side.)
   c. Written to a file for later playback.
2. Running on a different desktop machine, performing the same functions as above.
3. Running on a microcontroller board[19], functioning either as stand-alone data type converter between the DVP and devices such as those noted in 1-a above, or functioning as the brain of such devices directly.
   [19] Such as an Arduino (www.arduino.cc), Raspberry PI (www.raspberrypi.org), etc.
4. Note that the DPR could also be instantiated on a microcontroller board and simply read pre-created choreography data (generated via the DVP writing same to a file) from an SD memory card or the like. In this way, one has a convenient stand-alone choreography playback device.

Virtual Microcontroller Add-on
1. It is likely that having add-on "virtual microcontroller board" or "virtual (complete) artwork", visual display modules will be of assistance in helping users become familiar with the software without having to have, or be fully/properly familiar with, all hardware. (Having such a thing would also greatly assist in separating out hardware and software issues related to tech support calls from users.)
2. For example, one could have a virtual Arduino board with connected LEDs and/or connected hobby servo motors, where it functioned essentially identically to a real Arduino in response to receiving choreography data packets.
3. One way of implementing 2 above would be to actually film an Arduino connected to LEDs and motors in a manner where the visual appearance of each element was independent of the other[20]. In this way, one could:
   [20] As contrasted with, for example, the situation where two motors controlled multiple joint angles in a robotic arm, where the visual states of the system cannot be simply composited from the various separate elements, because each element does not function independently within a bounding box within the visual frame. In other words, we desire simply spatial "superposition" of elements to provide all that we need.
   a. Have the motion/color of each element change linearly across its entire range during filming of entire layout (simply responding to a choreography data stream that specified such linear change).
   b. Render each separate visual element (motor, LED, etc.) as a separate small-pixel-dimension video defined by a fixed bounding box.
   c. Index into each small video frame set based on choreography parameters at run time.

For example, film a motor rotating uniformly at one degree per second, and then render a small video of same at one fps. Then, at choreography time, let desired angle based on choreography data stream simply be the index[21] of the video frame of the video segment for that motor element. Then, dynamically composite this frame segment along with all the other scene element segments into the complete full size video frame.
   [21] Modulo one full rotation.

Key Innovations/Features
1. Ability to specify, within video editor, active CHSs—i.e., screen "real-estate"—that the CVP examines at CDF processing time.[22] This allows for:
   [22] In the current preferred embodiment, the active pixel area of interest is actually the bounding box (rectangle) surrounding the CHS. This choice was made for speed and simplicity reasons.
   a. Dramatically faster runtime execution speed when compared to being required to analyze the entire video frame.
   b. Non-choreography data to be present in choreography data frames outside of the defined choreography shape areas (including, for example, user comments).
2. Ability to specify choreography types (RGB, Rotation, etc.) within video editor.
3. Ability to specify choreography shape ID numbers within video editor.
   a. Ability to either manually assign ID numbers, or have them assigned automatically in an array fashion.
4. Ability to specify the mapping between CHSs, and parameters therein (e.g., the separate R, G, and B color channel in an RGB choreo shape) to hardware devices, output port type, and channel numbers therein (e.g., Arduino microcontroller hardware device, PWM ports, channels #1, #2, etc.), without requiring programming expertise—for example, via simple human-readable/editable text files.
5. Overall bounding area (typically a rectangle with colored line delineating its boundary—see green border in FIG. 3E) that defines the overall[23] "active" area that the computer vision element of the DVP (the CVP) will analyze.
   [23] Containing all choreography shapes—not to be confused with a (single) choreography shape itself.

This is of relevance in terms of aligning CHSs defined by the SDF (described and shown below) with pixel data in following CDFs. It is of particular importance when, for example, performing dynamic screen capture of a video editor monitor window, where the window may be smaller (or larger) than the contained video frame's true pixel dimensions. In this case, the bounding green rectangle allows the CVP to ascertain what area of the video editor window is slated for active processing/parsing, and dynamically scale it to match the pixel dimensions of the SDF that gives its otherwise raw pixel data meaning. In this way, everything "just works", in terms of the choreography pixel data aligning properly within each pre-defined CHS area.

6. Ability to intersperse comments within the video frames without intruding on the runtime choreography functionality.
7. Ability to see (typically within the DVP module) how the system has processed Configuration Frames (COFs)—in terms of having confirmation of such things as:

a. Proper CVP recognition of CHSs.
b. Proper OCR functionality of CHS type (RGB, ROT, etc.) and ID number.
c. Etc.
8. Ability to see on-screen numeric values associated with each CHS at runtime. See for example FIG. 3F.
9. Unlike the situation where one uses OCR in "the wild", where visual noise and letter/number variations in the image cause significant error rates during character detection, using OCR in a controlled environment such as the current invention, where one can 100% specify the font, font size, font style, font color, etc., and where there is minimal background visual noise, allows for essentially 100% recognition accuracy every time.
This permits a unique method for reliably and conveniently encoding human-readable commands etc. within a raster pixel image (i.e., video frame).
10. Ability to readily time-synchronize the motion, appearance, and lighting, of multiple choreography elements[24].

[24] I.e., physical device/display components.

11. Having a near "What you see is what you get" environment for choreography, and where the controlling colors and movements within the CDF can, within the video editor, be (for example) super-imposed on a layer containing the background scene. In this way, within the video editor, one can readily see how a kinetic artwork will look "in-situ", and then simply turn off the background scene layer to generate the actual kinetic sculpture choreography.[25]

[25] As simple example, imagine a room in which is placed a "sculpture", composed of a fixed-in-space planar 8×8 grid of choreographed RGB LEDs, mounted on a pedestal such that the plane of the LEDs is perpendicular to the room floor and facing the viewer. Then, the entire scene, in orthographic (or perspective, if done using a 3D animation package) view, and with running LED choreography (as part of overall simulation video), may be viewed for overall "effect". The important point is that, to then generate the actual physical sculpture choreography, all one has to do is turn off the background room scene layer, optionally, in some embodiments, add a green boundary-definition outer rectangle, generate an appropriate SDF to match the LED grid, and in orthographic front-on view, run the very same simulation as was used during the simulation/proposal stage.

DESCRIPTIONS AND IMPLEMENTATIONS

For Preferred Embodiments and Example Choreography Structures

Figure 3A:
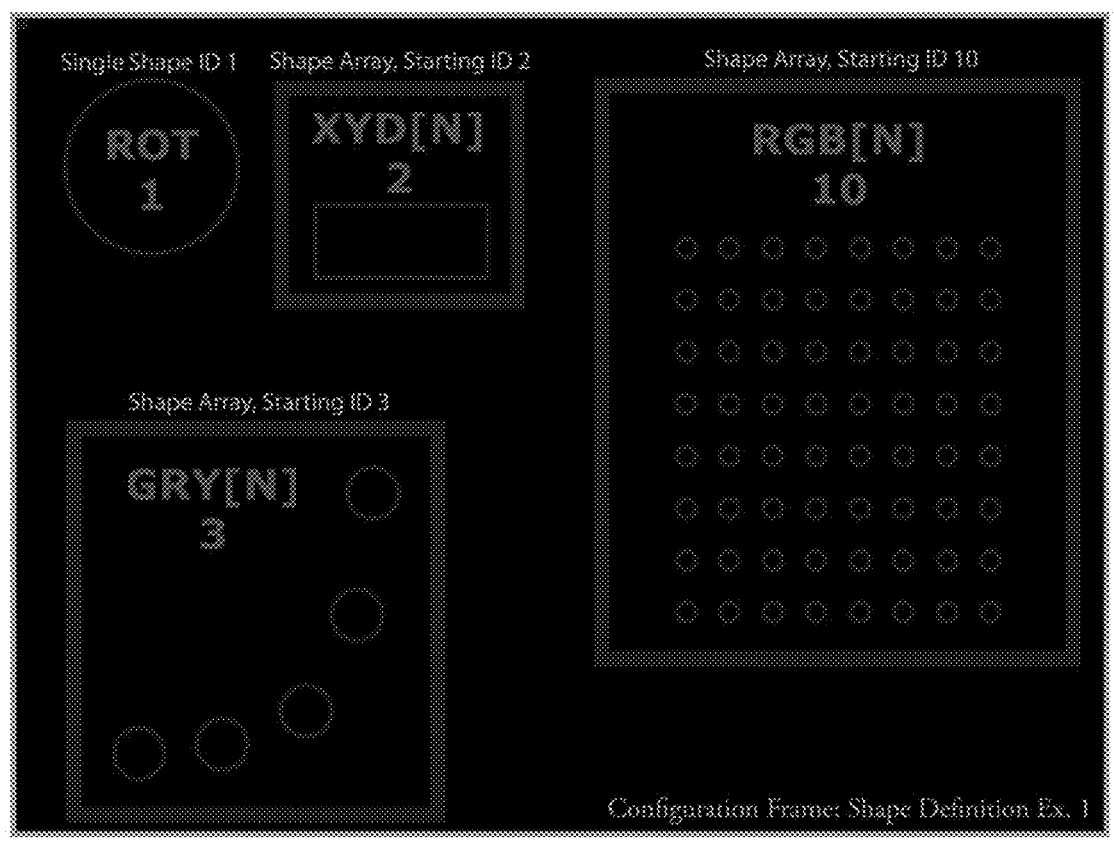

Shape Definition Frame (SDF): Overview: Example 1
As seen in FIG. 3A, a Shape Definition Frame (SDF), Ex. 1:
1) The green border rectangle designates to the CVP computer-vision-based "visual parser" the active to-be-processed area (that laying inside said rectangle).
2) Upper left blue little square, located in fixed/pre-defined location relative to green border rectangle, designates to the CVP that this is a SDF.
(All remaining elements lie inside the green border rectangle in 1 and outside the upper left blue little square in 2. The code related to the CVP assumes/implements this.)
3) Green comments are ignored entirely.
4) Blue elements define:
a) Scalar choreography shapes—CHSs (as in the circle around "ROT 1")
b) Boundaries for, and shapes within, arrays of CHSs (as seen in the rest of the blue elements in the figure).

5) Red elements (text) define the type of choreography element "ROT" for Rotation element, "XYD" for (x,y) dot, "RGB" for Red/Green/Blue values, and "GRY" for Grayscale values.
An "[N]" means that the designation is for an array, and tells the CVP to expect the red text to lie not within the shape itself, but rather within the blue border surrounding the entire array of shapes.
The number following the choreo type designation, and designation of array vs. scalar CHS, is an ID number that uniquely identifies the shape (if a scalar shape), or the ID of the first element of the array (if an array of shapes).

Shape Definition Frame (SDF): Implementation Details
Note that below descriptions are sufficient to allow someone of ordinary skill in the art (for the current invention, this means a programmer familiar with implementing CV-based code blocks, and in some cases, even just a "generic" coder comfortable with basic algebra) to create/duplicate the described invention without undue experimentation, referring simply to the public documentation for the OpenCV library and Tesseract library (located both at their source sites and on many third party public websites).
Note also that OpenCV provides ready-made functions for such things as:
A) Creating rectangular bounding boxes around polygons. E.g.:

```
cv::Rect rectBoundingForChoreographyArea =
    cv::boundingRect(theCHSPolygon); // Create bounding
    rectangle around CHS polygon.
```

B) Creating working 2D surface pallets (matrices of pixels) from said rectangles. E.g.:

```
cv::Mat matBoundingRectangleCloneForMask = cv::Mat::zeros
(rectBoundingForChoreographyArea.size( ), pMatChoreographyFrame-
>type( )); // Create a new Mat based on the CHS bounding rectangle.
("pMatChoreographyFrame" provides specification for the
"type" of cv::Mat—color, black and white, etc.)
```

Thus, we are assuming throughout that applying such functionality is straightforward for one of ordinary skill in the art without undue experimentation.
1) To locate the green border perimeter, one preferred method is to search toward the center of the image, from the extreme four edges of the image, along the four compass directions, until one detects a threshold-based level of green, without undue blue or red, following immediately by a sharply decreased level of green.
2) To locate the upper left little blue square denoting a SDF, simply use the upper left x and y coordinate of the green border perimeter (as located in 1) as the reference coordinate for the upper left of the little colored square.
3) To separate out RGB colors generally from within the raster pixel image (video frame), simply choose to examine the R, G, or B channel in RGB color space. (See code in 4 below.)
4) To define all CHSs:
a) Extract the blue color channel defining the choreography shapes.

----Using OpenCV----------------------------------
```
cv::Mat s_MatConfigFrame;   // The RGB Mat containing the video frame within the bounding green
    border, with the little colored upper left square erased.
```

```
cv::vector<cv::Mat> vecMatcolorChannels(NUM_COLOR_CHANNELS);    // A vector of Mats to
store individual color channels. NUM_COLOR_CHANNELS = 3.
cv::split(s_MatConfigFrame, vecMatcolorChannels);   // Split the color image into three separate
grayscale matrices, one for each color channel.
cv::Mat matBlackAndWhite;  // Target matrix that is thresholded B&W.
cv::threshold(vecMatcolorChannels[CV_BLUE_CHANNEL], matBlackAndWhite,
THRESHOLD_TOZERO_LEVEL, 255, cv::THRESH_BINARY);    // Threshold the shape (blue)
channel in preparation for shape extraction. (CV_BLUE_CHANNEL=0) (Typical good value of
THRESHOLD_TOZERO_LEVEL is around 150.)
``` b) Find the contours within the thresholded blue channel extracted above.

```
----Using OpenCV-----
    std::vector<cv::Vec4i> hierarchy;        // Vector to store contour hierarchy.
    typedef std::vector<cv::Point> Polygon;  // Vector for single shape.
    std::vector<Polygon> allContoursVector;  // Vector of contours (what will become CHSs.)
    cv::findContours(matBlackAndWhite, allContoursVector, hierarchy, CV_RETR_TREE,
    CV_CHAIN_APPROX_SIMPLE);   // Find contours and organize in hierarchy as described in
    OpenCV docs.
``` c) Enumerate, for (d) below and using standard methods (described on the web for OpenCV), each (outer) contour found above within the blue color channel, filtering for:
  i) Parents with no children (i.e., scalar shapes).
  ii) All children where they exist (i.e., each shapes within arrays of shapes).
(Note that inner/child contours that are simply the inner edge of (blue) finite-thickness, closed, lines/curves defining shapes or arrays of shapes are skipped over altogether.)
  d) At this point, it is useful (in part in order to speed up CV runtime analysis at the CDF processing phase) to reduce the contour set to more manageable form by converting each choreography shape "raw" contour into a polygon approximation of it. In the below, we make the approximation accuracy proportional to the arc-length of the original contour set (a standard technique). (Note: "true" in the arcLength and approxPolyDP functions means that the curve is closed.)

```
----Using OpenCV, applied to the items enumerated in (c) above-----
    cv::approxPolyDP(cv::Mat(outerContourRaw), outerContourPolygonApprox,
    cv::arcLength(cv::Mat(outerContourRaw]), true)*0.0025, true);// Approximate contour with accuracy
    proportional to the contour perimeter. (Variable names self-describe their function. Both are
    std::vectors of cv::Point. And 0.0025 was simply found to be a reasonably value experimentally.)
```

5) To ignore the green comments in SDFs (and GCFs), and examining image contents only within the area bounded by the green perimeter rectangle determined previously (the upper left little colored square having been erased prior), simply ignore the green channel altogether.

6) OCRing red text commands:
  a) Define the area to examine for each red text description by enumerating each outermost contour (CHS itself if scalar, or if array of CHSs, boundary for that array) within the blue channel.
  It may be convenient to create a rectangular bounding box around said shape is created using the OpenCV library call "cv::boundingRect". (If this path is chosen when creating the image subset to pass to the OCR module, it implies that no spurious red text may be present in the COFs outside any CHS (or CHS-array-containing boundary if applicable), yet within its rectangular bounding box.)
  b) Create image block based on the above blue-defined shape, transferring however only the red channel's data. (In other words, extract the red pixels from within the blue shape.)

7) Once step 6 is complete, one may then use an OCR such as the open source Tesseract library to parse all within said image block (e.g., via the Tesseract "GetUTF8Text" library call).
(Prior to OCRing, thresholding may, with certain fonts, be usefully applied (here with OpenCV) as per the below.

```
cv::threshold((*pMatTextChannel), matBlackAndWhite,
THRESHOLD_TOZERO_LEVEL, 255,
cv::THRESH_BINARY);   // Threshold the text (red) channel in
```

-continued

```
preparation for text OCR extraction, getting rid of minor background
noise, if any, as well as removing typical font antialiasing.
Note: pMatTextChannel is the red channel from the video frame
(post-separation it is a grayscale channel); matBlackAndWhite is
the output.)
```

Once OCR is complete, character data is available to allow:
a) Determination of choreograph type.
b) Whether the choreography shape is scalar or an array (based on presence of "[N]" or not).[26]

[26] Note that one can also determine whether choreography shape specification is of scalar or array type by whether any given outer contour has inner children (beyond the inner one defining a line of finite thickness) or not.

c) The single CHS ID if scalar, or the starting ID if array of CHSs.

8) For XYD (x,y) rectangular CHSs, if any, calculate and store the width X and height Y (used when normalizing values).

9) For ROT elements, if any, calculate the virtual "center" point by finding the visual center of mass of the bounding choreography shape (e.g., by using an OpenCV CV library call to "cv::moments" applied to the stored polygons).

10) For RGB and GRY elements, if any, calculate and store the choreo shape area (e.g., by using an OpenCV CV library call to "cv::contourArea" applied to the stored polygons) (used when normalizing values).

11) From all the above, we now create a data structure that allows properly interpreting, from later runtime pixel data within the CDFs, the desired choreography commands/data. Below is one preferred embodiment written in C++/pseudocode, where there would be as many entries as there are scalar and array CHSs in the image—e.g., 4 in SDF Ex. 1 as seen in FIG. 3A. (All data required to fill in the below "struct" is already available as described/detailed above.)

```
struct StructEnhancedCHS {
    std::vector<Polygon> vecRawCHS;      // The vector contains 1
    polygon if a scalar CHS, and N polygons if an array of CHSs,
    where the polygons referred to are those noted in 4-d above.
    enumChorType choreographyType;       // ROT, GRY, etc.
    int shapeID;        // Starting (if array of shapes) or only
    (if scalar shape) ID number.
    // Typically only one of three below relevant for any given shape
    type.
    cv::Point2f shapeVirtualCenterPoint;  // (x,y) pair of CHS's virtual
                                          center pivot point for ROT.
    float shapeArea;         // Area of CHS for RGB and GRY.
    float shapeX; float shapeY;         // Width X and height
    Y of rectangular CHS for XYD.
};
```

Figure 3B:
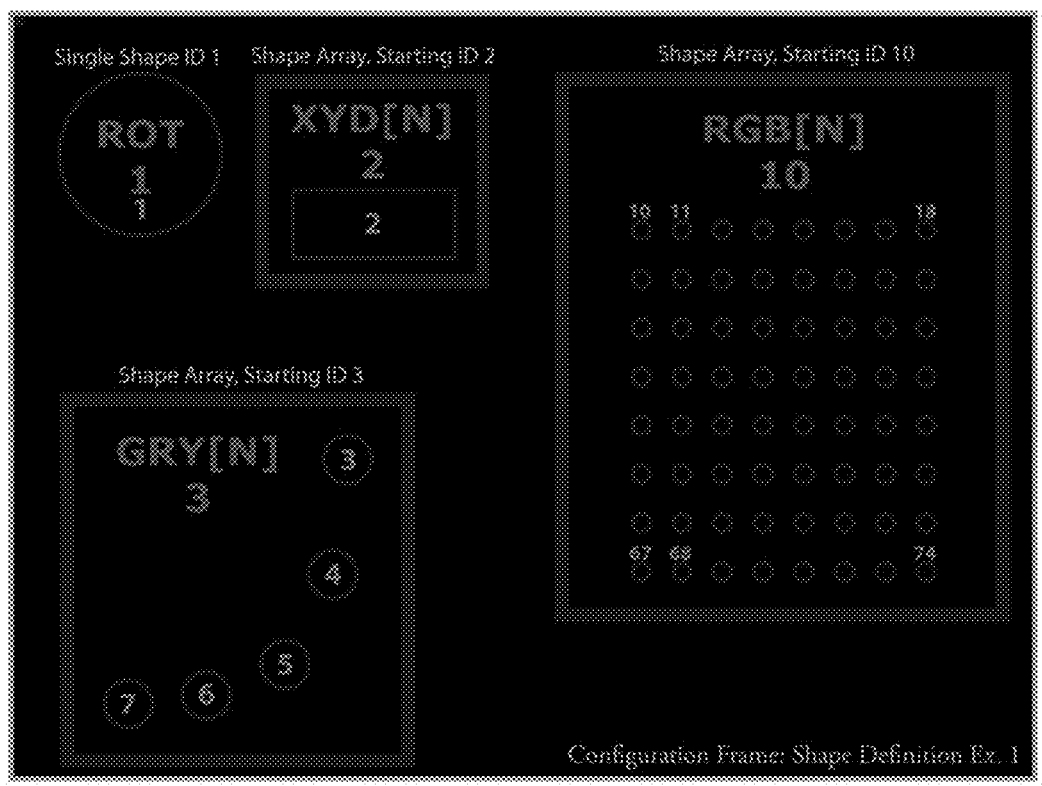
Figure 3C:

Thus, we would have:
std::vector<StructEnhancedCHS>vecEnhancedCHS;
12) Finally, two ordering operations are performed:
a) Sorting "vecEnhancedCHS" by starting/only ID number for array of CHSs/scalar CHS.
  We thus can conveniently display/transmit/search information from low to high shape ID number.
b) Sorting "vecRawCHS" by left-to-right, top to bottom (x,y) on-screen location. (See for example the CHS ID numbering in FIG. 2 below.) We thus have one preferred method for auto-assigning CHS shape IDs to arrays of same simply by beginning at the starting shape ID number and incrementing in left-right, top-down order.
(Note that any standard sorting algorithm may be used, such as the tried and true "bubble sort".)
SDF with the Addition of (Magenta) Auto-Program-Assigned and Placed Choreo Shape ID Numbers.
As seen in FIG. 3B, a dynamically annotated SDF from Ex. 1:
Numbers are generated and placed onscreen by the DVP module, using (in one preferred embodiment) the OpenCV "cv::putText" library call and the data structure described above. These numbers provide useful visual feedback to the user re understanding and debugging.
Shape Definition Frame (SDF): Overview: Example 2
As seen in FIG. 3C, a second SDF example:
In this case, we have 16 GRY grayscale elements. Other details remain as previously described.

Figure 3E:
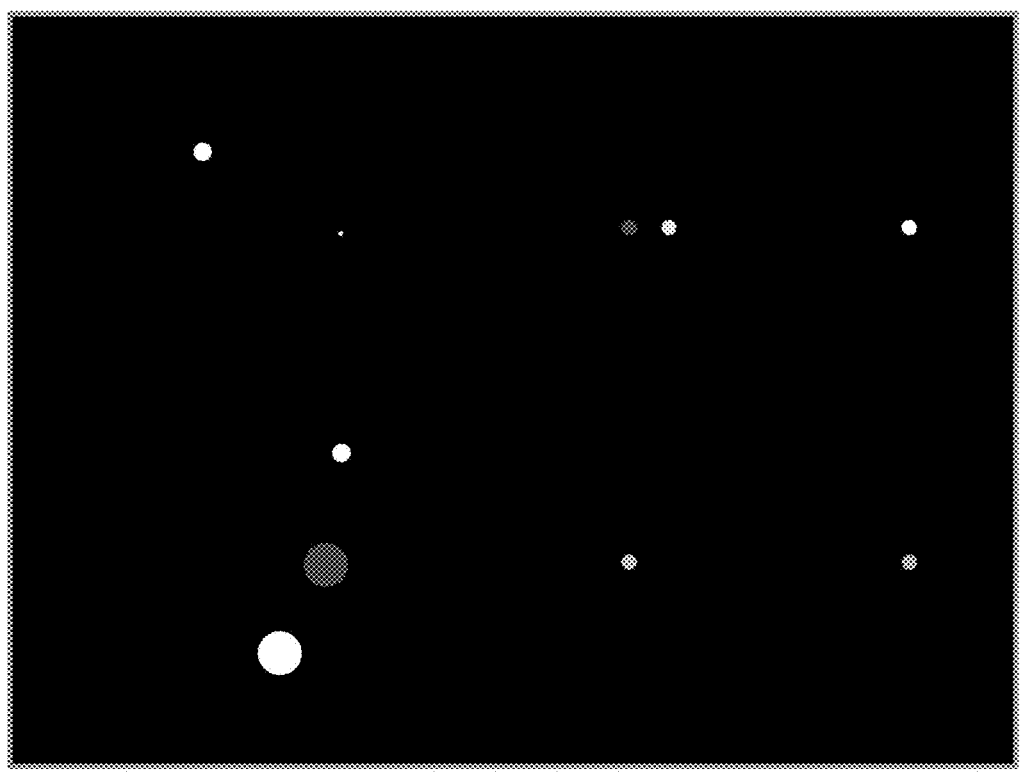
Figure 3F:
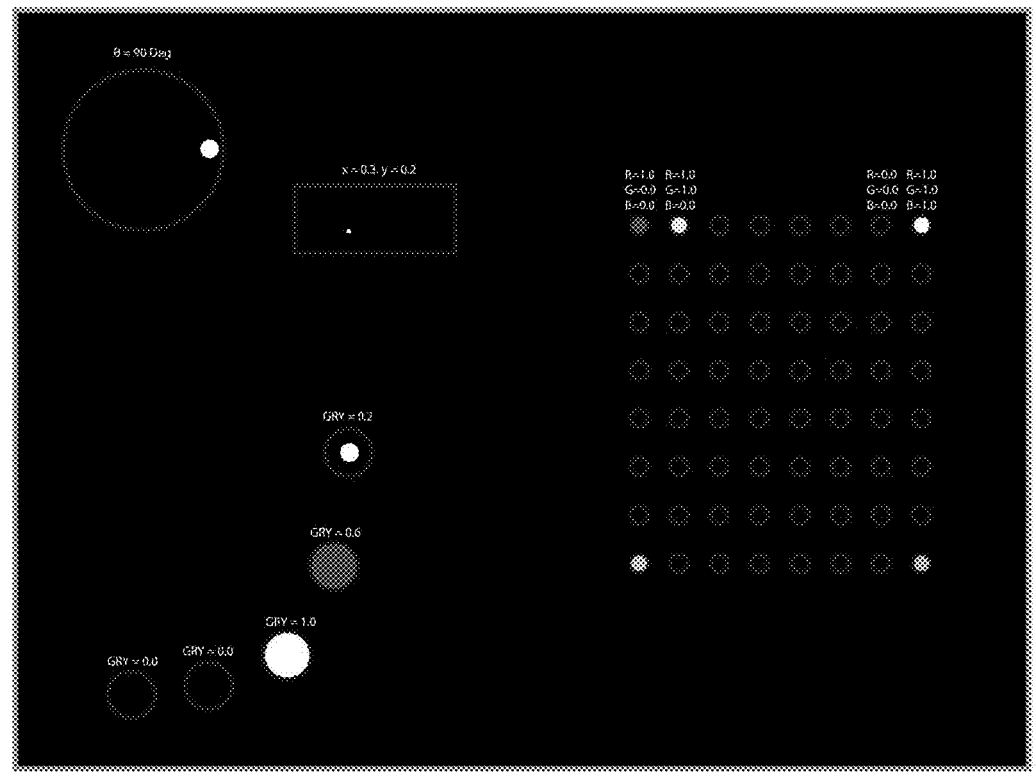
Figure 4A:
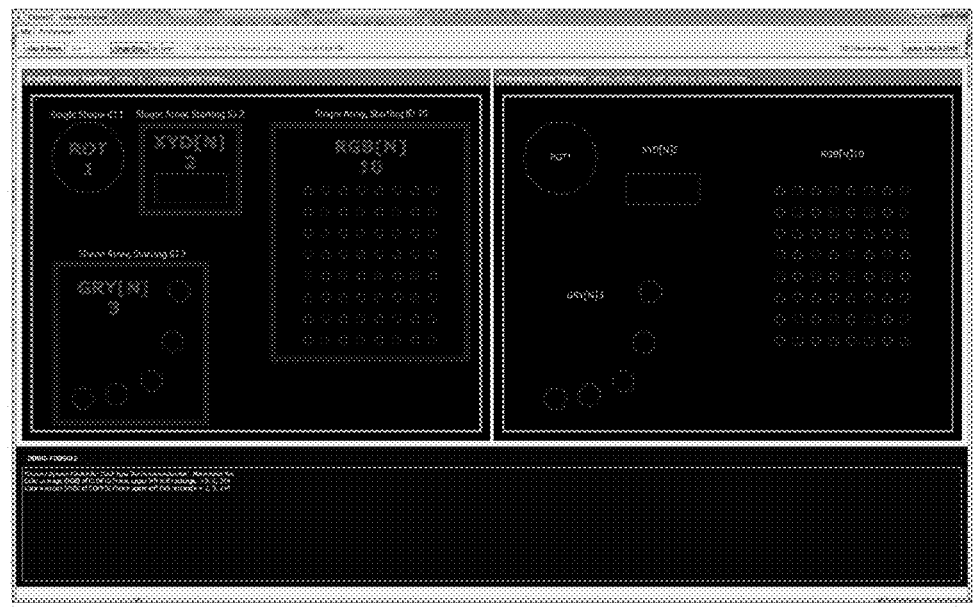
FIG. 4A-4D are screen captures from functional, running application that show a typical progression of steps, beginning with parsing the SDF, followed by runtime CDF processing.)
Figure 4B:
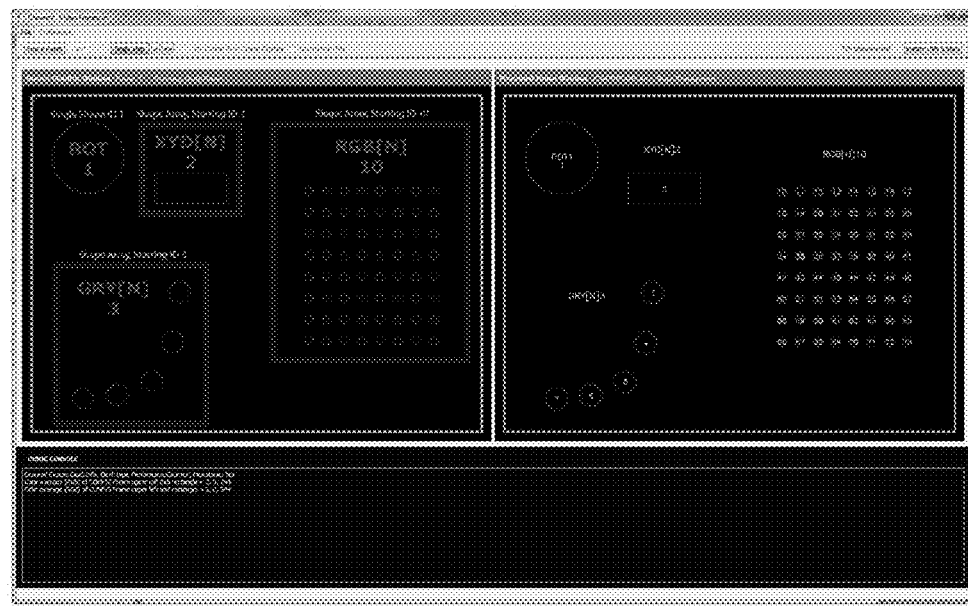
Figure 4C:
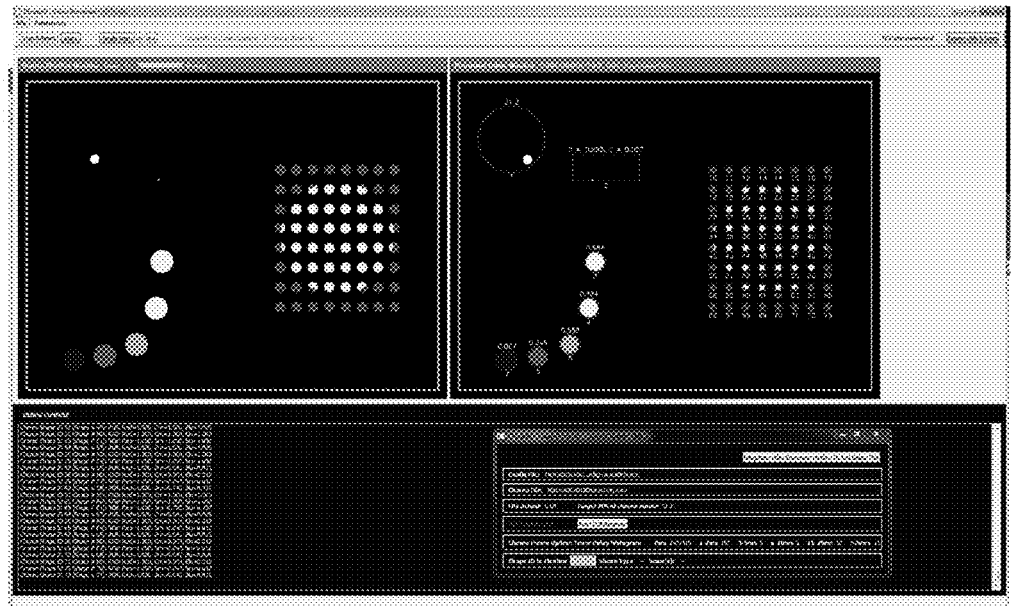
Figure 4D:
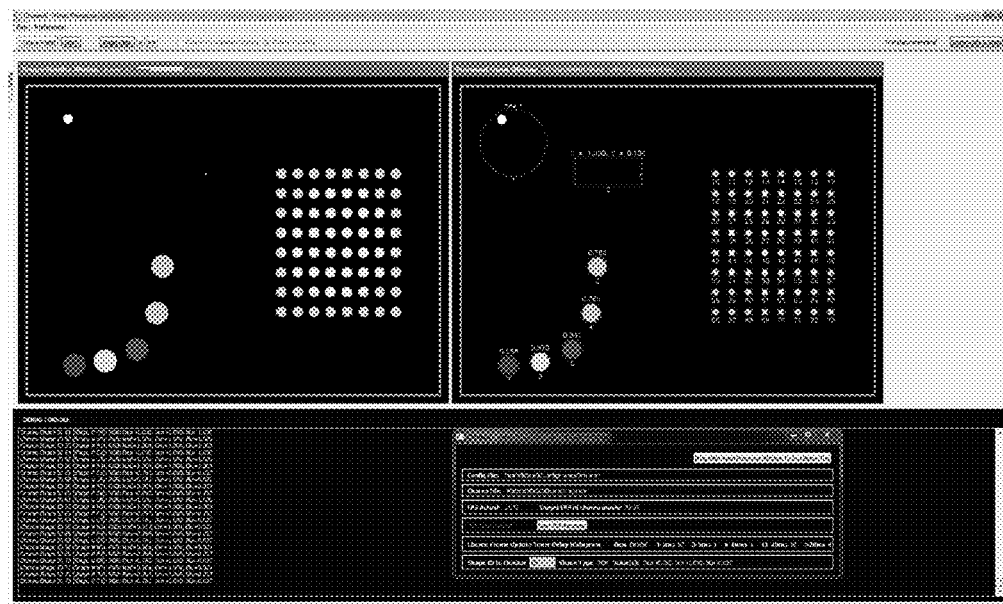

It is this layout that was used to perform a (successful) choreography test of TechnoFrolics Dancing Trees choreographed science-artwork (http://www.technofrolics.com/products-services/choreographed-iron-dust/) in October 2013 at TF's studio in Somerville, Mass.
Global Command Frame (GCF) Overview, Example 1:
As seen in FIG. 3D, a Global Command Frame (GCF), Ex. 1:
The GCF (in this preferred embodiment) denoted by a little red square in the upper left.
Green text is ignored entirely.
Red text is OCRed to extract the command text. Here that command indicates to start audio playback at video frame 1.
Global Command Frame (GCF): Implementation Details
The process of extracting text from GCFs is very similar to extracting from SDFs. Simply, in "Shape Definition Frame (SDF): Implementation details" above:
1) See steps 1-3. (In step 2, instead of checking for existence of little upper-left blue square, we check for existence of little upper-left red one.)
2) See steps 6 and 7, but where area to examine for red text is entire area enclosed within green bounding rectangle, rather than within blue-defined CHSs or arrays thereof. And as before, we extract red channel and green channel is ignored.
Choreography Data Frame (CDF): Overview: Example 1
As seen in FIG. 3E, a Choreography Data Frame (CDF), Ex. 1 and FIG. 3F, a dynamically annotated CDF from Ex. 1:
A typical ChoreoV runtime view appears in debug/verbose-display mode (vs. other options such as where there is no display at all, the video file has been parsed earlier, and entire choreography is running off an SD flash memory card on a microcontroller board, etc.), where:
In FIG. 3E we see a view of the user's "raw" CDF (designed/produced for the SDF choreography shape layout as introduced in FIG. 3A).
a) Note the green boundary rectangle in the CDF. This allows the CVP to determine the active screen area on which to perform analysis and extract choreography data. Importantly, the green rectangle need not match in size the pixel dimensions of the initial SDF—it will be dynamically scaled (for example via the OpenCV function "cv::resize") at choreography runtime to match—allowing said rectangle to be of any size (being downscaled, for example, within a video editor monitor window).
In FIG. 3F we see that content as analyzed by the ChoreoV CVP where:
a) The choreography shapes are overlaid onto the video, providing confirmation to user of their layout, position, size, etc.
b) The dynamically-calculated-from-video-frame-pixel-data runtime data values for each of the choreography shapes are similarly overlaid onto the video. For example, the ROT scalar circle choreography shape shows 90 deg rotation clockwise from the "12 noon" position (it uses the previously-stored visual center-of-mass of choreography shape as the virtual rotation point), the XYD rectangle choreography shape shows normalized x,y coordinates of (0.3, 0.2), the RGB circle array shows normalized RGB values of (1,0,0) for the red upper left circle area, (1,1,0) for the yellow next one to the right, etc., and the normalized grayscale values in the array of GRY choreography shapes (circles in this case) show various proportions of white vs. black within each circle's bounded area.

Choreography Data Frame (CDF): Implementation Details

Refer to "vecEnhancedCHS" as detailed above. It provides the key structural backdrop against which streaming choreography data—the CDFs—are interpreted, and the discussion below.

Note that for CDFs, the CVP examines only those areas within each previously calculated and stored CHS polygon and, for some operations, its bounding box. This both dramatically speeds up execution at runtime, but also allows any areas in the frame located outside said areas to contain whatever the user wishes, including, for example, comments. Thus, for each CDF frame, the steps are:

1) Scale the area within the green bounding rectangle to match that of the reference SDF.

2) Iterating through each item (struct) stored in "vecEnhancedCHS", and each polygon "vecRawCHS" therein:

a) For ROT objects: The virtual center of the choreography shape was calculated and stored in "vecEnhancedCHS" previously, as described elsewhere. The angle value is (in one preferred embodiment) dynamically created by:

i) Calculating the virtual center of mass of the moving little circle (or other small shape, located by the user near and interior to the choreography shape's perimeter). (By, for example, employing "cv::moments")

ii) Calculating the line from its virtual center to the virtual center of mass of the choreography shape. (Simple algebra.)

iii) Determining the angle between that line and a virtual fixed reference line, such as a virtual vertical line to 12 noon (as is used in the FIG. 3F example), a horizontal line, or reference line generated by perimeter dot's initial virtual center position drawn to the choreography shape's virtual center on system startup (i.e., at the first CDF). (Again, simple algebra.) Or alternatively, the reference angle could be explicitly specified in a text configuration file, or within the video frame as OCRed text.

iv) Adding that angle (plus or minus) to a (typically, in preferred embodiments) non-regenerating (non-aliasing) total rotation angle. (This implies angle change between frames must not be so large as to introduce aliasing artifacts.)

v) Storing that angle, associated with its particular CHS ID, in preparation for serializing entire CDF's worth of data.

b) For XYD objects:

i) See a) above re ROT objects, applying the same virtual center of mass calculation as was used for the moving perimeter shape to the moving tiny dot, and then simply referencing its position to one of the corners of the previously determined and stored choreography shape polygon (e.g., the lower left). Similarly, the origin can also be dynamically calculated by the first CDF, and the location of the dot at that time be defined as the (0,0) origin moving forward. Or alternatively, the origin could be explicitly specified in a text configuration file, or within the video frame as OCRed text.

ii) Normalizing x and y values using "structEnhancedCHS.shapeX" and "structEnhancedCHS.shapeY" to make the total range of travel 1.

iii) Storing that (x,y) pair, associated with its particular CHS ID, in preparation for serializing entire CDF's worth of data.

c) For RGB objects:

i) Calculating the sum of each pixel's values in each channel (R, G, and B), across all pixels within the previously defined and stored CHS polygon.

ii) Using the previously stored polygon area, normalizing each of these three values to the range 0-1.

iii) Storing that value triplet, associated with its particular CHS ID, in preparation for serializing entire CDF's worth of data.

d) For GRY objects: Perform the steps described above for RGB, and then average the three color channels, resulting in one grayscale value.

3) We now store all the above data for later retrieval. There are many data structures suitable for this. In one preferred embodiment, a single entry is shown below, written in C++/pseudocode, where there would be as many instances of "UnionCHSValue" in a vector of same as there are CHSs in the SDF (e.g., 71 in FIG. 3B).

```
struct StructRGB {float red; float green; float blue;};   // RGB triplet.
struct StructXYD {float x; float y;};   // XYD pair.
union UnionCHSValue {
    float grayscaleValue;    // To store GRY value, if relevant to this
                             shape.
    StructRGB rgbValue;      // To store RGB value, if relevant to this
                             shape.
    __int64 angle;           // To store ROT value (in 1/10ths of a degree),
                             if relevant to this shape.
    StructXYD xydValue;      // To store (x,y) pair value, if relevant to
                             this shape.
};
```

Thus, we would have vector of type shown below, where the shape ID would be the index into the vector:

std::vector<UnionCHSValue>vecCDF;

Serialization, Parsing, and Routing of Choreography Data

To recap where we are at this point:

1. We have explained that Configuration Frames (COFs), in particular the Shape Definition Frame (SDF), are defined and parsed, in order to allow processing the later-arriving Choreography Data Frames (CDFs).

2. We have explained how both COFs and CDFs are structured and are parsed by the VCP component of the DVP, including in that explanation several illustrations and examples.

3. We have provided an overall birds-eye view of system operation in various configurations within FIG. 2A through 2E, overview illustrations. (See also FIG. 4A through 4D, screen captures from functional running application.)

4. We have thus described the core elements of the invention that allows using video[27] to generate a choreography data stream that is suitable for controlling diverse display devices, and where the motions/colors/etc. of the physical device correspond in a direct, obvious, and intuitive manner to the video's evolving appearance. This data stream can be saved to a file for later playback or used for instant, live, low-latency, interactive device control.

[27] Creatable by anyone with a common video editor or via live capture or from pre-existing content.

Remaining System Elements

The core elements of the invention, in particular in terms of its novelty, power, ease-of-use, and patentability, have been detailed above. The remaining elements, while required for proper functioning of the overall system in typical preferred embodiments, and containing features of great utility and convenience, are not described in exhaustive detail because even with such omission, they are implementable by a competent programmer of ordinary skill in the art without undue experimentation. We do however outline them below for reference and completeness.

In typical preferred embodiments, the following structure and functionality, or similar variant, is present:

1. The vector "vecEnhancedCHS" (described in detail earlier) is serialized and sent from the DVP to the DPR via TCP/IP packets, RS232 serial, or similar means. See tab "ChoreoSysCMD-ChoreoConfig" within the "ChoreographyStructureAndDataFormat.xls" section below for detail of one preferred format.
2. In addition to information contained in vecEnhancedCHS, this serialized packet also includes information from section "ShapeToHardwareDeviceMapping.txt" below. The "ChoreoSysCMD-ChoreoConfig" tab section below contains details of the data format for this element as well.
3. Upon receipt of the serialized version of vecEnhancedCHS, the DPR forms data structures of appropriate types in preparation for receiving serialized versions of "vecCDF", the choreography data for each CDF. (For example, if vecEnhancedCHS indicates that there are 10 RGB elements, then the DPR will create a vector, or similar structure, to handle receipt of 10 RGB value triplets for each received CDF.)
4. Then at choreography run-time, each CDF is serialized, and its (essentially raw) value data piped (typically in real-time, frame-by-frame) to the DPR which has been primed to receive it. See tab "Choreo Per-Frame Data" below in section "ChoreographyStructureAndDataFormat.xls.pdf" for detail of one preferred format.[28]

[28] Minor format conversions may occur during the serialization process—for example, converting XYD floats to fixed-point fractions, with serialized data thus being effectively "integers".

5. This serialized packet also includes information such as frame number, target frame period, optional information regarding synchronization with audio, etc. The "Choreo Per-Frame Data" tab section below contains details of the data format for this element as well.
6. Upon receipt of each CDF's choreography values, and deserializing step for same, the values are used to control actual hardware display devices. The specifics of this are particular both to the display device in question, and the hardware and OS (if any) on which the DPR is instantiated. More detail:
   a. The preliminary display/choreography structure serial packet, and following choreography data packets, both as described above, allow the DPR to associate, for each CDF choreography value received:
      i. What hardware device to route it to (e.g., an Arduino microcontroller board).
      ii. What output port type on that device to route it to (e.g., a PWM[29] channel).

[29] Pulse Width Modulation.

iii. What channel within said port type to route it to (e.g., PWM channel 1).
   b. It is thus a straightforward matter for a programmer of ordinary skill in the art and without undue experimentation to, upon receipt of each CDF's data, appropriately route it to the display device.
   c. Take for example the case of TechnoFrolics Dancing Trees choreographed science-artwork (http://www.technofrolics.com/products-services/choreographed-iron-dust/): Upon the DPR's receipt of 16 CDF "GRY" 8 bit byte values, they are forwarded on, preceded by their PWM channel number, via the PC parallel port and in a proprietary data format employed by the DT artwork[30], to the artwork electronics itself.

[30] A simple (channel, value) byte pair.

d. See FIG. 2A through 2E, overview illustrations, for additional information.
7. Notes:
   a. The data format described in the "Choreo Per-Frame Data" tab section below also provides for sending only choreography values that have exceeded a predefined threshold of change from their prior frame value, in order to reduce transmission bandwidth.

CONCLUDING NOTES

1. As per standard patent language, it should be understood that the specific configuration(s) drawn or described here should not limit the coverage of any potential Utility patent using this Provisional patent as reference, but rather the eventual Claims in said final Utility patent should determine coverage. So for example:
   a. The program could be written in languages other than C++.
   b. The OpenCV library could be replaced by any library or code snippets that performs similar computer vision functionality.
      i. Further, more than one suitable method exists for calculating such things as:
         1. The average RGB color or average grayscale value of a region.
         2. The rotational angle of a dot around a virtual center, as well as the specification/determination of the virtual center[31], as well as replacing the dot with a rotating line segment (standard CV algorithms allow detecting such a line segment angle), etc.

[31] For example, for defining the ROT shape's virtual center, rather than calculating the virtual center of mass of the visual choreography shape (as described above), one could have a manually-user-defined center.

3. The (x,y) position of a dot (or other (ideally relatively small) shape) within a bounding rectangle.
         4. Etc.
   c. Similarly, the Tesseract OCR library could be replaced by any library/code performing similar functions.
      i. Going further, the OCR element of the functionality, while important and convenient, is not required. Alternative methods for designating type of choreography object (Grayscale, RGB, Rotational, X-Y, etc.), and its ID number (1, 2, 3, or A, B, C, etc.), could be used, ranging from specific choreography object boundary color or shape, to binary glyphs (linear array of bits or more complex patterns, color or grayscale), etc.
   d. While Grayscale, RGB value, Rotation, and (X,Y) position are obvious elements of interest, certainly choreography objects are not limited to those. For example, one could create an specialized object to control a theater light with left/right and up/down angle control, and RGB color control, by (for example) an on-screen colored central circle, left-hand vertical bar whose length denotes up/down angle, and overhead bar whose length denotes left/right angle.

e. The DVP—Desktop Video Processor—should be understood to also potentially be runnable on a sufficiently fast, with sufficient software support, mobile device such as an Apple iPad, or a custom microcontroller and/or FPGA/ASIC module designed for said or similar purpose.

f. While passing the structure of the choreography-data-packets-to-be first, and then passing the raw data later from the runtime choreography frames, is most bandwidth efficient, it is certainly not the only option. One could pass the structure explicitly within each packet's data, making parsing easier on the receiving end, but bandwidth usage greater. Or one could pass in a hard-coded implicit fashion, resulting in bandwidth savings at the cost of flexibility. Similarly, while preferred embodiments typically send data in binary form, one could alternatively send ASCII—with the tradeoff of greater readability and easier parsing, but resulting in higher bandwidth requirements.

g. Assignment of choreography shape id numbers could be, instead of orthogonally top to bottom, left to right as it is now, applied via other algorithms, such as distance from the center of the shape, and angle off the x axis.

h. Regarding the green border rectangle defining active screen area: While having this element is in many cases desirable (in order, as discussed previously, to allow dynamically resizing virtual camera screen captures of CDFs from (say) within video editors to match their SDF), it is certainly not a requirement. One could simply insure that the SDF matched in pixel dimensions the size of the SDF, or use some other readily implementable method (e.g., a hard-coded scaling factor) to insure proper image content alignment between SDF and CDF.[32]

[32] In the case of live capture from a camera and similar situations, the green border can either be in the viewed scene itself or, if performing live screen capture via a virtual camera (present in addition potentially to the physical camera), one could simply add a background green rectangle to (say) the desktop outside of the on-screen physical-camera capture monitoring window.

i. There are alternative data formats that could be used for transmission of packets of parsed COF and CDF choreography data to that delineated in the "ChoreographyStructureAndDataFormat.xls" section.

2. Should the user wish the DVP to denote multiple DPRs located at, say, differing IP addresses, one could simply, for example:

a. Add the target IP address as red text within video frame in the form "IP:192.168.1.0" following the red text specifying choreography type and shape ID.

b. Create multiple versions of both "vecEnhancedCHS" and matching "vecCDF", one pair for each IP address.

c. At choreography runtime, separately form serialized packets for a choreography structure and its corresponding runtime values, routing each said matched element pair to its appropriate IP address.

3. Note that average grayscale area within a shape can be specified within the CDF either by a uniform grayscale density within that shape or, for example, a fully-white interior shape that expands to fill the bounding choreography shape.

4. Note that a fully functional prototype of the system was run at TechnoFrolics Somerville, Mass. studio October of 2013. It achieved well over 30 fps on videos 800× 600 in size, running on a Quad Core Intel PC, Windows 7 64 bit, W3550 XEON CPU, 12 Gigs of RAM. It was used to choreography TechnoFrolics Dancing Iron Dust science/artwork, it having sixteen GRY choreography shapes each controlling sixteen 8 bit analog channels of electromagnet data, running directly from Adobe Premiere CS5.5 playing back movie, with audio, within the Premiere environment, and with dynamic virtual camera screen capture, and dynamic bounding region scaling (green border rectangle shown above), occurring in parallel.

SupportedHardware.txt

Example/preferred-embodiment-specification format for supported hardware.
; ";" beginning lines mean comment.
; Last updated David Durlach 2014 Jun. 6.
; Draft format for defining device (artwork etc.) brain and I/O control modules/add-ons.

```
<SYSTEM>
    DEVICE_NAME="ArduinoCore", OUTPUT_DESCRIPTION="pwm", NUMBER_CHANNELS="5"
    DEVICE_NAME="ArduinoAdafruitServo16Shield", OUTPUT_DESCRIPTION="pwm",
NUMBER_CHANNELS="16"
    DEVICE_NAME="RaspberryPiCore", OUTPUT_DESCRIPTION="GPIOByteA",
NUMBER_CHANNELS="1".
<USER>
    DEVICE_NAME="DancingTrees", OUTPUT_DESCRIPTION="MagnetCurrent",
NUMBER_CHANNELS="16"
    DEVICE_NAME="DancingTrees", OUTPUT_DESCRIPTION="LightBrightness",
NUMBER_CHANNELS="2"
    DEVICE_NAME="DancingBanners", OUTPUT_DESCRIPTION="PositionAngle",
NUMBER_CHANNELS="64"
    DEVICE_NAME="MyDevice", OUTPUT_DESCRIPTION="MyOutputDescription",
NUMBER_CHANNELS="MyNumberChannels"
```

ShapeToHardwareDeviceMapping.txt

Example/preferred-embodiment specification format for mapping CHS choreography shapes and intra-shape data channels (e.g., R, G, and B in an RGB shape) to hardware devices and their channel number.
; This file contains mappings between ChoreoV Shape IDs specified within the video file along with their parameter designation if any (such as RGB_R for the red channel of an RGB choreo shape type), and actual hardware devices and their output device and channel number.
; Last updated David Durlach 2014 Jun. 6. (Refers to SupportedHardware.txt to confirm devices, params, and channel numbers exist and are within range etc.)
;
;
; Lines beginning with a ";" are treated as comments.
; "[ ]" means "Replace contents with actual value.

; This file is parsed on every ChoreoV run instance, not just program startup, and thus may be modified and re-parsed without restarting ChoreoV.exe.
; Format of each lines is: "ChoreoShape([id], [param])>HardwareDevice([name], [outputDescription], [channel])", Where:
;
; ------------------------------------------------------------------------------------
;
; "id" is the choreo Shape ID as user-defined in the video file.
;
; "param" specifies which value associated with shape to map the hardware in question. Currently supported:

| | |
|---|---|
| "GRY" | The single Grayscale value. |
| "RGB_R" | The Red channel of an RGB shape. |
| "RGB_G" | The Green channel of an RGB shape. |
| "RGB_B" | The Blue channel of an RGB shape. |
| "ROT" | The angle of a Rotary shape. |
| "XYD_X" | The X channel of an XYD shape. |
| "XYD_Y" | The Y channel of an XYD shape. |
| "NO_HRDW" | A "NULL" hardware device - just for convenience/testing. |

"Name" is the name of the hardware device in question. Currently supported:
; "DancingTrees"
; "DancingBanners"
; "outputDescription" defines the hardware output for the device in question.
; For "DancingTrees", it can be "MagnetCurrent" or "Lights".
; For "DancingBanners", it can be "PositionAngle".
; "HardwareDeviceChannel" is the channel number for the hardware device, and parameter, in question, where:
; For "DancingTrees:MagnetCurrent", values can be 1-16.
; For "DancingTrees:LightBrightness", values can be 1-2.
; For "DancingBanners:PositionAngle", values can be 1-64.
; Notes:
; a) If a device has only one channel, simply use 1 for the channel number.
; b) ID Numbers must match what is in video. They need not be contiguous, or monotonically ordered, but must be unique integers greater than 1.
; Examples:
;
; Below maps 16 GRY choreo shapes to channels 1-16 of electromagnet driver for Dancing Trees choreographed iron dust artwork.
ChoreoShape(1, GRY)>HardwareDevice(DancingTrees, MagnetCurrent, 1)
ChoreoShape(2, GRY)>HardwareDevice(DancingTrees, MagnetCurrent, 2)
ChoreoShape(3, GRY)>HardwareDevice(DancingTrees, MagnetCurrent, 3)
ChoreoShape(4, GRY)>HardwareDevice(DancingTrees, MagnetCurrent, 4)
ChoreoShape(5, GRY)>HardwareDevice(DancingTrees, MagnetCurrent, 5)
ChoreoShape(6, GRY)>HardwareDevice(DancingTrees, MagnetCurrent, 6)
ChoreoShape(7, GRY)>HardwareDevice(DancingTrees, MagnetCurrent, 7)
ChoreoShape(8, GRY)>HardwareDevice(DancingTrees, MagnetCurrent, 8)
ChoreoShape(9, GRY)>HardwareDevice(DancingTrees, MagnetCurrent, 9)
ChoreoShape(10, GRY)>HardwareDevice(DancingTrees, MagnetCurrent, 10)
ChoreoShape(11, GRY)>HardwareDevice(DancingTrees, MagnetCurrent, 11)
ChoreoShape(12, GRY)>HardwareDevice(DancingTrees, MagnetCurrent, 12)
ChoreoShape(13, GRY)>HardwareDevice(DancingTrees, MagnetCurrent, 13)
ChoreoShape(14, GRY)>HardwareDevice(DancingTrees, MagnetCurrent, 14)
ChoreoShape(15, GRY)>HardwareDevice(DancingTrees, MagnetCurrent, 15)
ChoreoShape(16, GRY)>HardwareDevice(DancingTrees, MagnetCurrent, 16)
Preferences.txt
 Contains several preference settings for the DVP, including some that affect core functionality.
; Preferences etc.
; yes or no
DEBUG_MODE_STARTUP_STATE=yes
; yes or no
TIPS_MODE_STARTUP_STATE=no
; Whether to force a [0,1] range in XYD mode. Would/could be true for situation where origin in lower left of rectangle, otherwise not. True or false.
FORCE_NORMALIZATION_BOUNDARIES_IN_XYD=false
; Whether to read the zero point for Rotation Choreo Shapes from first choreography frame, or from below.
; (Generally, if using virtual camera screen capture, you should specify below because otherwise "random" frames are likely to zero things and cause confusion . . . )
; (Common for all ROTs.)
READ_INITIAL_ROT_VALUE_FROM_FIRST_CHOREO_FRAME=false
INITIAL_ROT_ANGLE_DEGREES=0
; Whether to read the zero point for XYD Choreo Shapes from first choreography frame, or from below.
; (Generally, if using virtual camera screen capture, you should specify below because otherwise "random" frames are likely to zero things and cause confusion . . . )
; Values measured in pixels, and must lie within size of choreo Shape bounding rectangles. (Common for all XYDs.)
READ_INITIAL_XYD_VALUE_FROM_FIRST_CHOREO_FRAME=false
INITIAL_X=0
INITIAL_Y=0
; Below specifies color channel thresholds for deciding whether command items (upper left little square, Choreo Shapes, Command Text, etc.) are "Red" vs. "Green" vs. "Blue".
; In order to "pass muster", the desired color must exceed the high threshold and the other two undesired colors must be less than lower threshold.
; Typical values 150 for the high, 50 for the low.
COLOR_MATCHING_THRESHOLD_HIGH_CHANNEL=150
COLOR_MATCHING_THRESHOLD_LOW_CHANNELS=50
; Threshold for array of Shapes count, above which we no longer print out values (because they would likely overlap on the screen).
SHAPE_ARRAY_COUNT_THRESHOLD_TO_DISABLE_DISPLAYING_VALUES=15
; Threshold for array of Shapes count, above which we no longer print out ShapeID numbers (because they would likely overlap on the screen).
; (This number is typically larger than the above.)
SHAPE_ARRAY_COUNT_THRESHOLD_TO_DISABLE_DISPLAYING_SHAPEID=100

; The Amcap.exe-discovered WDM camera index for virtual camera screen capture utility. (Index starts at 0 at the top of Amcap's list.)
SYSTEM_WDM_VIRTUALCAMERA_INDEX=1
*End of Provisional Patent Application (PPA) as Previously Filed*

I claim:

1. A system for kinetic artwork choreography, where at least one element of the artwork has physical motion that may be choreographed, and comprising:
 a) one or more computers;
 b) one or more templates that select the manner in which pixel data within a video stream is to be interpreted during its conversion into one or more data streams appropriate for direct device control, where said templates:
  i) specify one or more graphic elements whose size, shape, and placement specify areas of interest to be processed within incoming choreography video frames
  ii) include one or more identifiers that provide a mapping between said graphic elements and an associated set of kinetic artwork elements:
 c) code to convert said pixel data into said data streams as specified by said templates;
 d) code to forward said data streams to one or more items from the following set:
  i) kinetic artwork;
  ii) data storage device;
  iii) network, LAN, WAN, or Internet.

2. A system as claimed in claim 1 wherein the video stream derives from continuous capture of a defined area of the user's computer display screen, where said defined area may be the entire display screen or a user-selectable smaller windowed area therein, whereby users may control kinetic artworks directly and in real-time from video frame pixel data generated by third party applications.

3. A system as claimed in claim 1 wherein the video stream derives from one or more video files residing on one or more non-volatile computer data storage devices.

4. A system as claimed in claim 1 wherein the video stream derives from one or more live camera feeds.

5. A system as claimed in claim 1 wherein the video stream derives from one or more network feeds: LAN, WAN, or Internet.

6. A system as claimed in claim 1 wherein available said types of extractable choreography information include, at a minimum, both:
 a) rgb color value within said area of interest;
 b) rotation angle value of a shape within said area of interest referenced to a defined center of rotation.

7. A system as claimed in claim 1 where one color is used to denote said areas of interest and a distinct other color used to denote said identifiers, thereby allowing said color difference to be used to programmatically distinguish between said two graphic components.

8. A system as claimed in claim 1 wherein said identifiers are comprised of graphic ASCII characters, whereby:
 a) conventional OCR software may be used to extract information contained therein;
 b) the format may be designed to be easily readable and understandable by the user.

9. A system as claimed in claim 1 wherein a multiplicity of choreographable elements are automatically assigned unique identification codes such as numbers.

10. A claim as in claim 9 wherein the user may conveniently remap the automatically assigned codes to codes of the user's choice, whereby the order in which the choreography values arrive within the choreography data stream corresponds in a natural manner to a particular artwork's choreographable element addressing scheme.

11. A system as claimed in claim 1 wherein said areas of interest for one or more graphic elements are dynamically modified by numeric choreography values extracted from one or more other graphic elements.

12. A system as claimed in claim 1 wherein there is provided an on-screen graphic kinetic artwork simulator, whereby users may:
 a) visualize their choreography;
 b) debug temporal stutters and/or content corruption within their choreography data stream;
 c) separate problems in the software from problems in the hardware.

13. A system as claimed in claim 12 wherein said graphic kinetic artwork simulator provides for graphics simulation elements to be one or more of either or both:
 a) images, such as jpeg, png, or similar, where at least one of such images has at least one of its parameters, from the set of: color, shape, size, opacity, z-layer;
controlled by streaming choreography data;
 b) movies, such as .mov, .avi, or similar, where at least one of such movies either has its displayed frame dynamically determined by streaming choreography data, or has its single frame appearance transformed as per the image transformations described in a) above, or both.

14. A method for kinetic artwork choreography, where at least one element of the artwork has physical motion that may be choreographed, and comprising the steps of:
 a) specifying the manner in which pixel data within a video stream is to be interpreted during its conversion into one or more data streams appropriate for direct device control where;
  i) said specification includes specifying one or more graphic elements whose size, shape, and placement specify areas of interest to be processed within incoming choreography video frames;
  ii) said specification includes one or more identifiers that provide a mapping between said graphic elements and an associated set of kinetic artwork elements;
 b) converting said pixel data into said data streams as specified by said pixel interpretation manner;
 c) forwarding said data streams to one or more items from the following set:
  i) kinetic artwork;
  ii) data storage device;
  iii) network, LAN, WAN, or Internet.

15. A method as claimed in claim 14 where one color is used to denote said areas of interest and a distinct other color used to denote said, thereby allowing said color difference to be used to programmatically distinguish between said two graphic components.

16. A method as claimed in claim 14 wherein the video stream derives from continuous capture of a defined area of the user's computer display screen, where said defined area may be the entire display screen or a user-selectable smaller windowed area therein, whereby users may control kinetic artworks directly and in real-time from video frame pixel data generated by existing commercial applications.

* * * * *